United States Patent
Lefebvre et al.

(10) Patent No.: US 11,202,988 B2
(45) Date of Patent: Dec. 21, 2021

(54) $SO_x$ CAPTURE USING CARBONATE ABSORBENT

(71) Applicant: SAIPEM S.P.A., Milan (IT)

(72) Inventors: Sylvain Lefebvre, Québec (CA);
Richard Surprenant, Québec (CA);
Ferrere Clerveaux, Québec (CA);
Gabriel Veilleux, St-Denis-de-Brompton (CA); David Zhang, Montréal (CA)

(73) Assignee: SAIPEM S.P.A., Milan (IT)

( * ) Notice: Subject to any disclaimer, the term of this patent is extended or adjusted under 35 U.S.C. 154(b) by 21 days.

(21) Appl. No.: 16/637,217

(22) PCT Filed: Aug. 10, 2018

(86) PCT No.: PCT/CA2018/050968
§ 371 (c)(1),
(2) Date: Feb. 6, 2020

(87) PCT Pub. No.: WO2019/028558
PCT Pub. Date: Feb. 14, 2019

(65) Prior Publication Data
US 2020/0368679 A1 Nov. 26, 2020

Related U.S. Application Data

(60) Provisional application No. 62/544,382, filed on Aug. 11, 2017.

(51) Int. Cl.
*B01D 53/50* (2006.01)
*B01D 53/14* (2006.01)
(Continued)

(52) U.S. Cl.
CPC ........... *B01D 53/502* (2013.01); *B01D 51/10* (2013.01); *B01D 53/1406* (2013.01);
(Continued)

(58) Field of Classification Search
CPC .... B01D 53/50; B01D 53/501; B01D 53/502; B01D 53/62; B01D 53/78; B01D 53/96;
(Continued)

(56) References Cited

U.S. PATENT DOCUMENTS

| 3,533,748 A | 10/1970 | Finfer et al. |
| 2006/0286011 A1 | 12/2006 | Anttila et al. |
| 2013/0142712 A1* | 6/2013 | Nagayasu .............. B82Y 30/00 422/619 |

OTHER PUBLICATIONS

International Search Report and Written Opinion of the International Searching Authority for International Patent Application No. PCT/CA2018/050968 dated Oct. 22, 2018, 10 pages.

(Continued)

*Primary Examiner* — Timothy C Vanoy
(74) *Attorney, Agent, or Firm* — Merchant & Gould P.C.

(57) ABSTRACT

A desulfurization gas process includes water vapor, $CO_2$ and $SO_x$ (x=2 and/or 3). In a treatment unit, the gas contacts a cooled alkaline aqueous solution having a temperature lower than an initial gas temperature, water and a carbonate of an alkali metal, to cool the gas, condense some water vapor and absorb $SO_x$ in the carbonate-containing solution, produce an $SO_x$-depleted gas and an acidic aqueous solution including sulfate and/or sulfite ions. The $SO_x$-depleted gas and a portion of the acidic aqueous solution can then be withdrawn from the treatment unit. Carbonate of the alkali metal can be added to remaining acidic aqueous solution to obtain a made-up alkaline aqueous solution. This solution can be cooled and reused as the cooled alkaline aqueous solution. An $SO_x$ absorbent solution includes a bleed stream from a $CO_2$-capture process, sodium or potassium carbonate, and an acidic aqueous solution obtained from desulfurization.

22 Claims, 8 Drawing Sheets

(51) Int. Cl.
*B01D 53/62* (2006.01)
*B01D 53/96* (2006.01)
*B01D 51/10* (2006.01)

(52) U.S. Cl.
CPC ......... *B01D 53/1475* (2013.01); *B01D 53/62* (2013.01); *B01D 53/96* (2013.01); *B01D 2251/304* (2013.01); *B01D 2251/306* (2013.01); *B01D 2251/606* (2013.01); *B01D 2255/804* (2013.01); *B01D 2258/0283* (2013.01)

(58) Field of Classification Search
CPC .......... B01D 2251/30; B01D 2251/606; B01D 2257/302; B01D 2257/504; B01D 2258/0283; Y02C 20/40; Y02E 20/32; Y10S 55/30
See application file for complete search history.

(56) References Cited

OTHER PUBLICATIONS

Durham, J. et al., "Influence of Gaseous Nitric Acid on Sulfate Production and Acidity in Rain", Atmos. Environ., 15(6): 1059-1068 (1981).

Kaji, R. et al., "So2 Absorption by Water Droplets", Journal of Chemical Engineering of Japan, 18(2): 169-172 (1985).

Sander, R., "Compilation of Henry's Law Constants for Inorganic and Organic Species of Potential Importance in Environmental Chemistry", Max-Planck Institute of Chemistry, Germany, 3: 1-107 (Apr. 1999), http://www.mpch-mainz.mpg.de/sander/res/henry.html.

Srivastava, R., "Conrolling SO2 Emissions: A Review of Technologies", Report EPA/600/R-00/093, U.S. Environmental Protection Agency, Office of Research and Development, 113 pages (Nov. 2000).

* cited by examiner

SO$_x$ CAPTURE USING CARBONATE ABSORBENT

RELATED APPLICATION

This application is a National Stage Application of PCT/CA2018/050968 filed on Aug. 10, 2018, which claims priority to U.S. provisional application No. 62/544,382 filed on Aug. 11, 2017, the contents of which are incorporated herein by reference in their entireties. To the extent appropriate, a claim of priority is made to each of the above-disclosed applications.

TECHNICAL FIELD

The technical field generally relates to processes and systems for the capture of $SO_2$ and or $SO_3$ from gases that are produced by various industrial processes, using carbonate absorbent. The technical field also relates to processes and systems for the capture of $SO_2$ and/or $SO_3$ from $CO_2$-containing gases to be further treated for $CO_2$ removal, such as from flue gases after the combustion of carbon-based fuels.

BACKGROUND

Gases produced by industrial processes, such as post-combustion flue gases, generally comprise water vapour ($H_2O$), carbon dioxide ($CO_2$), nitrogen ($N_2$) and oxygen ($O_2$), and may also comprise some other compounds such as acid gases $SO_x$, $NO_x$, $H_2S$, depending on the process from which the flue gas originates. "$SO_x$" refers to $SO_2$ and $SO_3$, and $NO_x$ refers to NO and $NO_2$. These acid gases are chemically absorbed when contacted with alkaline absorption solutions commonly used in $CO_2$ capture systems.

$CO_2$ capture can generally refer to processes such as $CO_2$ absorption and stripping for pure $CO_2$ production, $CO_2$ removal from gases, $CO_2$ pressure swing adsorption, and others. $CO_2$ utilization may comprise $CO_2$ transformation into carbonate based compounds, use for algae growth, biofuel applications in fuel cells, such as molten carbonate fuel cells (MCFC).

For numerous post-combustion $CO_2$ capture processes, when the flue gas to be treated contains $SO_x$ in addition to $CO_2$, the flue gas is first to be treated to reduce its $SO_x$ concentration below a threshold value to avoid adverse impact (e.g., reaction, precipitation, inhibition) which may occur in contact with the absorption solution or the adsorbent, as the case may be, that could result in a decrease of the absorption solution or adsorbent capacity. Conventional $SO_x$ removal technologies are used for such a purpose.

These conventional $SO_x$ removal technologies can be classified as once-through or regenerable, and both comprise wet or dry processes. The once-through wet technologies use limestone, lime, magnesium-enhanced lime or sea water. Technologies consisting of a dry process involve lime spray drying, duct sorbent injection, furnace solvent injection and circulating fluidized bed. Regenerable wet technologies are based on the use of sodium sulfite, magnesium oxide, sodium carbonate and amine; and regenerable dry processes are based on activated carbon. Such technologies are detailed in Srivastava, R. K., *Controlling SO$_2$ Emission: A review of Technologies*, Report EPA/600/R-00/093, November 2000, 113 pages.

These technologies have been implemented as an auxiliary unit to the $CO_2$ capture or $CO_2$ utilization process and there has been no integration between both processes (SO$_x$ removal and $CO_2$ capture and/or $CO_2$ utilization).

In a $CO_2$ capture process using an alkaline potassium carbonate solution as the absorbing media, $SO_x$ and $NO_x$ will be absorbed in the alkaline absorption solution and react with the potassium ions resulting in a loss of the absorption solution capacity and the formation of salt precipitates above a specific threshold concentration. To avoid such efficiency losses or precipitation, $SO_x$ and $NO_x$ levels in the absorption cycle are controlled by bleeding solution from the main absorption loop. In order to reduce the bleed rate required, $SO_x$ or $NO_x$ contaminants are removed from the flue gas before the main absorption process in a gas conditioning step which also sets the gas inlet temperature for the absorbing process, in a direct or indirect contact unit. In addition, $CO_2$ capture processes can generate wastes associated with the degradation of the absorption solution. For example, in the case of a $CO_2$ capture process that uses amines, such as monoethanolamine (MEA), a side-reaction produces a heat-stable salts as undesirable by-products that need to be disposed of.

Even though the $SO_x$ levels are considerably reduced in the gas conditioning step, the residual quantity of the contaminants will be absorbed into the alkaline absorption solutions used for $CO_2$ capture and will accumulate, eventually resulting in a precipitate, which will consume some of the cations away from the carbonate and reduce the solution's absorption capacity. To compensate for these two impacts, part of the absorption solution is bled off to reduce the circulating solution's concentration in sulfate, nitrite and nitrate ions, and the bled off solution is replaced with a fresh carbonate solution. The solution bleed is then disposed of using normal health, safety and environmental practices. This bleeding and replenishment strategy is used in conventional $CO_2$ capture processes using amines as absorption compounds. A $CO_2$ capture process using this common strategy is illustrated in FIG. 1.

Referring to FIG. 1, a flue gas (1) is first cooled down in a cooling unit (2) using a water feed (3). Heated water (4) then leaves the cooling unit. The cooled flue gas is then sent to a $CO_2$ absorption unit (6) where $CO_2$ and other acid gases, such as $SO_x$ and $NO_x$ are absorbed in an absorption solution that flows through the absorption unit (6). The treated $CO_2$-depleted gas is then released to the atmosphere (7). The absorption solution containing the absorbed $CO_2$, $SO_x$ and $NO_x$ (8) is heated using a heat exchanger (9) and then sent to a stripping unit (11) where the $CO_2$ is desorbed from the solution using temperature and/or pressure swing conditions and released as a recovered $CO_2$ stream (12) for further processing. The absorption solution leaving the stripping unit, which can be referred to as a regenerated absorption solution (10), is lean in $CO_2$. However, the lean-absorption solution (10) still contains ions coming from the reactions of $SO_x$ and $NO_x$ in the absorption solution. These ions will accumulate in the absorption solution over time as it circulates through the absorption unit (6) and the stripping unit (11). In order to control their concentration levels in the absorption solution, a volume of the solution is removed as absorption solution bleed stream (13) and replaced with fresh solution (14). In the case of an absorption solution based on the use of carbonates as absorption compounds, such as the UNO MK3 process, $SO_x$ and $NO_x$ are recovered as $KNO_3$ and $K_2SO_4$ solids in the process and removed from the absorption solution using a hydrocyclone.

The impact of $SO_x$ and $NO_x$ on the performance of $CO_2$ capture processes is explained in further detail as follows. $SO_2$ reacts in aqueous media to form a proton and a bisulfite ion (Equation 1). In an aqueous solution, the bisulfite ion is in equilibrium with a sulfite ion and a proton (Equation 2). $SO_3$ gas reacts with water to form sulphuric acid (Equation 3). In the presence of oxygen, sulfite ions are oxidized to sulfate ions (Equation 4). Sulfate ions are susceptible to precipitation in carbonate absorption solutions, such as a potassium carbonate solution. Precipitation of the $K_2SO_4$ salt may reduce performance or jeopardize the $CO_2$ capture process. Additionally, the $K^+$ that reacts to form $K_2SO_4$ can no longer be used in the capture of $CO_2$, thus reducing the absorption capacity of the solution.

$$SO_{2(g)} + H_2O \leftrightarrow HSO_3^- + H^+ \quad \text{Equation 1}$$

$$HSO_3^- \leftrightarrow H^+ + SO_3^{2-} \quad \text{Equation 2}$$

$$SO_3^{(g)} + H_2O \leftrightarrow H_2SO_4 \quad \text{Equation 3}$$

$$HSO_3^- + 0.5O_2 \leftrightarrow SO_4^{2-} + H^+ \quad \text{Equation 4.}$$

In general, there is typically much more $SO_2$ in the gas compared to $SO_3$, and therefore Equations 1 and 2 typically dominate.

$NO_x$ are also combustion by-products that may be present in flue gases in various ratios. $NO_x$ can be absorbed by the absorption solution and transformed into nitrite/nitrate ions in solution as shown in Equation 5, 6 and 7.

$$NO_{(g)} + NO_{2(g)} + H_2O \leftrightarrow 2NO_2^- + 2H^+ \quad \text{Equation 5}$$

$$2NO_{2(g)} + H_2O \leftrightarrow NO_2^- + NO_3^- + 2H^+ \quad \text{Equation 6}$$

$$2NO_2 + SO_3^{2-} + H_2O \rightarrow 2H^+ + 2NO_2^- + SO_4^{2-} \quad \text{Equation 7.}$$

A certain percentage of $NO_x$ may be irreversibly absorbed by the absorption solution and accumulates as a salt. As for $SO_x$, this accumulation may incur an absorption solution loss which results in a decrease $CO_2$ capture capacity. Each contaminant ($SO_x$ and $NO_x$) has a different rate of reaction with the absorption solution. $SO_2$, the main $SO_x$ constituent, is much more soluble in aqueous solution than NO and $NO_2$. The Henry constant (in water at 25° C.) for $SO_2$ is 1.2 M/atm while this constant is at 0.0019 and 0.041 for NO and $NO_2$ respectively (Durham J. L. et al., *Influence of gaseous nitric acid on sulfate production and acidity in rain*, Atmos. Environ., 15, 1059-1068, 1981). The kinetics of $SO_2$ reaction with water is very fast and is considered as instantaneous (Ryuichi Kaji et al., Journal of Chemical Engineering of Japan, Vol. 18 (1985) No. 2, p. 169-172). Another reference in this field is Sander, R., *Compilation of Henry's Law Constants for Inorganic* and *Organic Species of Potential Importance in Environmental Chemistry*, Version 3, 1999, Max-Planck Institute of Chemistry, Germany. The kinetics for the $NO_x$ reactions are far slower. The fact that the $NO_x$ molecules need to react with themselves before reacting with water (see Equations 5 and 6) combined with the fact that their concentrations in water are very low makes those reactions much slower. This is exemplified in the document "*Cost and Performance Baseline for Fossil Energy Plants*" Volume 1a: *Bituminous Coal (PC) and Natural Gas to Electricity Revision* 3, 2015, DOENETL-2015/1723, p. 76 and p. 98, describing the effect of a $CO_2$ capture unit (based on the CANSOLV technology) on the emission of $SO_x$ and $NO_x$ from a pulverized coal power plant. In the case B11 described in this document, the unit reduced the total $SO_x$ emissions of the power plant from 0.318 kg/MWh to zero. This same unit has no effect on $NO_x$ emissions.

As mentioned above, conventional ways to manage impurities in $CO_2$ capture processes would be to maintain an adequate $SO_4^{2-}$ concentration level below the concentration leading sulfate salt precipitation, which may be done by bleeding and disposing of a portion of the absorption solution and replacing it by an equivalent volume of fresh solution. However, as explained above, the absorption and reaction of $SO_x$ is faster and more complete than for $NO_x$, resulting is an absorption solution having a $SO_4^{-2}$ ion concentration close to the precipitation threshold concentration, whereas the concentration of $NO_x$ species would be much lower than the precipitation threshold concentration. This leads to the absorption of $SO_x$ in the absorption solution predominantly controlling the amount of make-up and bleed of the absorption loop.

There is a need for a technology that further enhances $SO_x$ removal from gases produced in industrial processes. There is also a need for a technology that further enhances $CO_2$ capture from gases produced in industrial processes through proper $SO_x$ removal from such gases prior to $CO_2$ capture.

SUMMARY

In some implementations, there is provided a process for desulfurization of a gas comprising at least water vapour, $CO_2$ and $SO_x$, where x is equal to 2 and/or 3, the gas having an initial gas temperature, the process comprising: contacting, in a treatment unit, the gas with a cooled alkaline aqueous solution comprising water and a carbonate of an alkali metal and having a temperature lower than the initial gas temperature, thereby causing cooling of the gas, condensation of some water vapour and absorption of the $SO_x$ in the carbonate-containing solution, and producing a $SO_x$-depleted gas and an acidic aqueous solution comprising sulfate and/or sulfite ions; recovering the $SO_x$-depleted gas from the treatment unit; purging a portion of the acidic aqueous solution exiting the treatment unit (or any other removal step for removing at least a portion of the sulfate and/or sulfite ions); adding carbonate of the alkali metal to a remaining portion of the acidic aqueous solution exiting the treatment unit to obtain an alkaline aqueous solution; and cooling the alkaline aqueous solution to result in the cooled alkaline aqueous solution.

In some implementations, there is provided a system for removing $SO_x$ contained in a gas comprising at least water vapour, $CO_2$ and $SO_x$, where x is equal to 2 and/or 3, the gas having an initial gas temperature, the system comprising: a treatment unit for contacting the gas with a cooled alkaline aqueous solution comprising water and a carbonate of an alkali metal and having a temperature lower than the initial gas temperature, wherein in the treatment unit the gas is cooled, some water vapour is condensed and the $SO_x$ are absorbed in the cooled alkaline aqueous solution; a mixing unit for receiving a first portion of an acidic aqueous solution comprising sulfate and/or sulfite ions recovered from the treatment unit and adding thereto carbonate of the alkali metal so as to obtain an alkaline aqueous solution; a purge line for purging a second portion of the acidic aqueous solution recovered from the treatment unit (or any other removal system for removing at least a portion of the sulfate and/or sulfite ions); and a cooling unit for cooling the alkaline aqueous solution to be returned to the treatment unit as the cooled alkaline aqueous solution.

In some implementations, there is provided a use of an alkaline carbonate-containing solution for desulfurization and cooling of a gas comprising at least water vapour, $CO_2$ and $SO_x$, where x is equal to 2 and/or 3, and recovering a cooled $SO_x$-depleted gas, wherein the alkaline carbonate-containing solution has a temperature lower than an initial gas temperature and is obtained by mixing an acidic aqueous solution with a carbonate of an alkali metal, and wherein the acidic aqueous solution comprises sulfate and/or sulfite ions resulting from an absorption of the $SO_x$ of the gas in the alkaline carbonate-containing solution.

In some implementations, there is provided a process for removing $CO_2$ from a gas comprising at least water vapour, $CO_2$ and $SO_x$, where x is equal to 2 and/or 3, the gas having an initial gas temperature, the process comprising a pre-treatment loop for desulfurizing the gas and recovering a $SO_x$-depleted gas, and an absorption loop for removing $CO_2$ from the $SO_x$-depleted gas, wherein the process comprises: cooling an alkaline aqueous solution comprising water and a carbonate and bicarbonate of an alkali metal to obtain a cooled alkaline aqueous solution having a temperature lower than the initial gas temperature; contacting the gas with the cooled alkaline aqueous solution in a desulfurization unit of the pre-treatment loop, thereby causing cooling of the gas, condensation of some water vapour and absorption of the $SO_x$ in the cooled alkaline aqueous solution, and producing the $SO_x$-depleted gas and an acidic aqueous solution comprising sulfate and/or sulfite ions; purging a first portion of the acidic aqueous solution exiting the desulfurization unit; supplying the $SO_x$-depleted gas which contains $CO_2$ from the desulfurization unit to a $CO_2$ capture unit of the absorption loop; in the $CO_2$ capture unit, contacting the $SO_x$-depleted gas with an absorption solution comprising water and carbonate of the alkali metal, thereby causing absorption of the $CO_2$ in the absorption solution and producing a $CO_2$-depleted gas and a carbonate and bicarbonate-rich absorption solution; treating the carbonate and bicarbonate-rich absorption solution in a stripping unit to generate a purified $CO_2$ gas and recover a carbonate and bicarbonate-lean absorption solution; bleeding a fraction of an absorption solution circulating in the absorption loop (e.g., from the carbonate and bicarbonate-lean absorption solution or from the carbonate and bicarbonate-rich absorption solution) as an absorption solution bleed; and mixing the absorption solution bleed with a second portion of the acidic aqueous solution exiting the desulfurization unit of the pre-treatment loop to produce the alkaline aqueous solution.

In some implementations, there is provided a system for removing $CO_2$ from a gas comprising at least water vapour, $CO_2$ and $SO_x$, where x is equal to 2 and/or 3, the gas having an initial gas temperature, the system comprising a pre-treatment loop for desulfurizing the gas and recovering a $SO_x$-depleted gas and an absorption loop for removing $CO_2$ from the $SO_x$-depleted gas, wherein the pre-treatment loop comprises:

a desulfurization unit for contacting the gas with a cooled alkaline aqueous solution comprising water and a carbonate and bicarbonate of an alkali metal and having a temperature lower than the initial gas temperature, wherein in the desulfurization unit the gas is cooled, some water vapour is condensed and the $SO_x$ are absorbed in the cooled alkaline aqueous solution;

a mixing unit for mixing a first portion of an acidic aqueous solution comprising sulfate and/or sulfite ions recovered from the desulfurization unit with an absorption solution bleed recovered from the absorption loop to obtain an alkaline aqueous solution comprising water and the carbonate and bicarbonate of the alkali metal;

a purge line for purging a second portion of the acidic aqueous solution recovered from the desulfurization unit; and a cooling unit for cooling the alkaline aqueous solution to be returned to the desulfurization unit as the cooled alkaline aqueous solution; and wherein the absorption loop comprises:

a $CO_2$ capture unit for contacting the $SO_x$-depleted gas with an absorption solution comprising water and carbonate of the alkali metal and producing a $CO_2$-depleted gas and a carbonate and bicarbonate-rich absorption solution; and a stripping unit for treating the carbonate and bicarbonate-rich absorption solution to recover a purified $CO_2$ gas and generate a carbonate and bicarbonate-lean absorption solution at least a part of which is recirculated back into the $CO_2$ capture unit at the absorption solution.

In some implementations, there is provided a process for desulfurization of a gas comprising at least water vapour, $CO_2$ and $SO_x$, where x is equal to 2 and/or 3, the process comprising: contacting, in a treatment unit, the gas with an alkaline aqueous solution comprising water and a carbonate of an alkali metal to cause absorption of the $SO_x$ in the alkaline aqueous solution, to produce an $SO_x$-depleted gas and an acidic aqueous solution comprising sulfate and/or sulfite ions; recovering the $SO_x$-depleted gas from the treatment unit; withdrawing the acidic aqueous solution from the treatment unit; purging a portion of the acidic aqueous solution as a purged stream and producing a remaining portion of the acidic aqueous solution; adding carbonate of an alkali metal to the remaining portion of the acidic aqueous solution to obtain a made-up alkaline aqueous solution; and reintroducing the made-up alkaline aqueous solution into the treatment unit.

In some implementations, there is provided a system for removing $SO_x$ contained in a gas comprising at least water vapour, $CO_2$ and $SO_x$, where x is equal to 2 and/or 3, the system comprising: a treatment unit for contacting the gas with an alkaline aqueous solution comprising water and a carbonate of an alkali metal, wherein in the treatment unit some water vapour is condensed and the $SO_x$ are absorbed in the alkaline aqueous solution to form an acidic aqueous solution comprising sulfate and/or sulfite ions; a mixing unit for receiving a first portion of the acidic aqueous solution recovered from the treatment unit and for adding thereto carbonate of the alkali metal so as to obtain a regenerated alkaline aqueous solution; a purge line for purging a second portion of the acidic aqueous solution recovered from the treatment unit; and a recirculation line for feeding the regenerated alkaline aqueous solution back into the treatment unit.

In some implementations, there is provided a use of an alkaline carbonate-containing solution for desulfurization of a gas comprising at least water vapour, $CO_2$ and $SO_x$, where x is equal to 2 and/or 3, and recovering a cooled $SO_x$-depleted gas, wherein the alkaline carbonate-containing solution is obtained by mixing an acidic aqueous solution with a carbonate of an alkali metal, and wherein the acidic aqueous solution comprises sulfate and/or sulfite ions resulting from an absorption of the $SO_x$ of the gas in the alkaline carbonate-containing solution.

In some implementations, there is provided a process for removing $CO_2$ from a gas comprising at least water vapour, $CO_2$ and $SO_x$, where x is equal to 2 and/or 3, the process comprising a pre-treatment loop for desulfurizing the gas and recovering a $SO_x$-depleted gas, and an absorption loop for removing $CO_2$ from the $SO_x$-depleted gas, wherein the process comprises: contacting the $SO_x$-depleted gas with an absorption solution comprising water and carbonate of the alkali metal, thereby causing absorption of the $CO_2$ in the absorption solution and producing a $CO_2$-depleted gas and a carbonate and bicarbonate-rich absorption solution; treating the carbonate and bicarbonate-rich absorption solution in a stripping unit to generate a purified $CO_2$ gas and recover a carbonate and bicarbonate-lean absorption solution; bleeding a fraction of the absorption solution circulating in the absorption loop as an absorption solution bleed; supplying at least a portion of the absorption solution bleed to the pre-treatment loop as part of a desulfurization solution; contacting the gas with the desulfurization solution in a desulfurization unit of the pre-treatment loop, thereby causing absorption of the $SO_x$ in the alkaline aqueous solution, and producing the $SO_x$-depleted gas and an acidic aqueous solution comprising sulfate and/or sulfite ions; purging a first portion of the acidic aqueous solution exiting the desulfurization unit; supplying the $SO_x$-depleted gas which contains $CO_2$ from the desulfurization unit to a $CO_2$ capture unit of the absorption loop; mixing the second portion of the acidic aqueous solution exiting the desulfurization unit of the pre-treatment loop with at least a portion of the absorption solution bleed, to produce the desulfurization solution.

In some implementations, there is provided a system for removing $CO_2$ from a gas comprising at least water vapour, $CO_2$ and $SO_x$, where x is equal to 2 and/or 3, the system comprising a pre-treatment loop for desulfurizing the gas and recovering a $SO_x$-depleted gas and an absorption loop for removing $CO_2$ from the $SO_x$-depleted gas, wherein the pre-treatment loop comprises:

a desulfurization unit for contacting the gas with an alkaline aqueous solution comprising water and a carbonate and bicarbonate of an alkali metal, wherein in the desulfurization unit $SO_x$ are absorbed in the alkaline aqueous solution to produce an acidic aqueous solution;

a mixing unit for mixing a first portion of the acidic aqueous solution comprising sulfate and/or sulfite ions recovered from the desulfurization unit with an absorption solution bleed recovered from the absorption loop to obtain an alkaline aqueous solution comprising water and the carbonate and bicarbonate of the alkali metal; and a purge line for purging a second portion of the acidic aqueous solution recovered from the desulfurization unit; and
wherein the absorption loop comprises:

a $CO_2$ capture unit for contacting the $SO_x$-depleted gas with an absorption solution comprising water and carbonate of the alkali metal and producing a $CO_2$-depleted gas and a carbonate and bicarbonate-rich absorption solution; and a stripping unit for treating the carbonate and bicarbonate-rich absorption solution to recover a purified $CO_2$ gas and generate a carbonate and bicarbonate-lean absorption solution at least a part of which is recirculated back into the $CO_2$ capture unit at the absorption solution.

In some implementations, there is provided a use of a bleed stream obtained from a $CO_2$-capture process and comprising sodium or potassium carbonate for desulfurization of a gas comprising water vapour, $CO_2$ and $SO_x$, where x is equal to 2 and/or 3 and production of an $SO_x$-depleted gas.

In some implementations, there is provided an $SO_x$ absorbent solution comprising: a bleed stream obtained from a $CO_2$-capture process and comprising sodium or potassium carbonate; and an acidic aqueous solution obtained from desulfurization of a $SO_x$-containing gas. In some implementations, there is provided a gas pre-treatment solution for absorbing contaminants from a $CO_2$-containing gas, comprising: a bleed stream obtained from a $CO_2$-capture process and comprising sodium or potassium carbonate; and an acidic aqueous solution obtained from desulfurization of a $SO_x$-containing gas. The $SO_x$ absorbent solution and/or the gas pre-treatment solution can have one or more feature as described herein.

In some implementations, there is provided a process for desulfurization of a gas comprising at least water vapour, $CO_2$ and $SO_x$, where x is equal to 2 and/or 3, the process comprising: contacting, in a treatment unit, the gas with an alkaline aqueous solution comprising water and a carbonate of an alkali metal to cause absorption of the $SO_x$ in the alkaline aqueous solution, to produce an $SO_x$-depleted gas and an acidic aqueous solution comprising sulfate and/or sulfite ions; withdrawing the $SO_x$-depleted gas from the treatment unit; withdrawing the acidic aqueous solution from the treatment unit; removing at least a portion of the sulfate and/or sulfite ions from the acidic aqueous solution to produce a remaining acidic aqueous solution; adding carbonate of an alkali metal to the remaining acidic aqueous solution to obtain a made-up alkaline aqueous solution; and reintroducing the made-up alkaline aqueous solution into the treatment unit.

In some implementations, the removing of at least a portion of the sulfate and/or sulfite ions from the acidic aqueous solution can comprise purging a portion thereof to produce a remaining portion thereof as the remaining acidic aqueous solution. In addition, it is noted that where such purging or use of a purge line is mentioned herein it could be feasible alternatively or additionally perform other methods to deplete the acidic aqueous solution of sulfate and/or sulfite ions.

It should be noted that any of the features described above and/or herein can be combined with any other features, processes and/or systems described herein, unless such features would be clearly incompatible.

DETAILED DESCRIPTION

Figure 1:
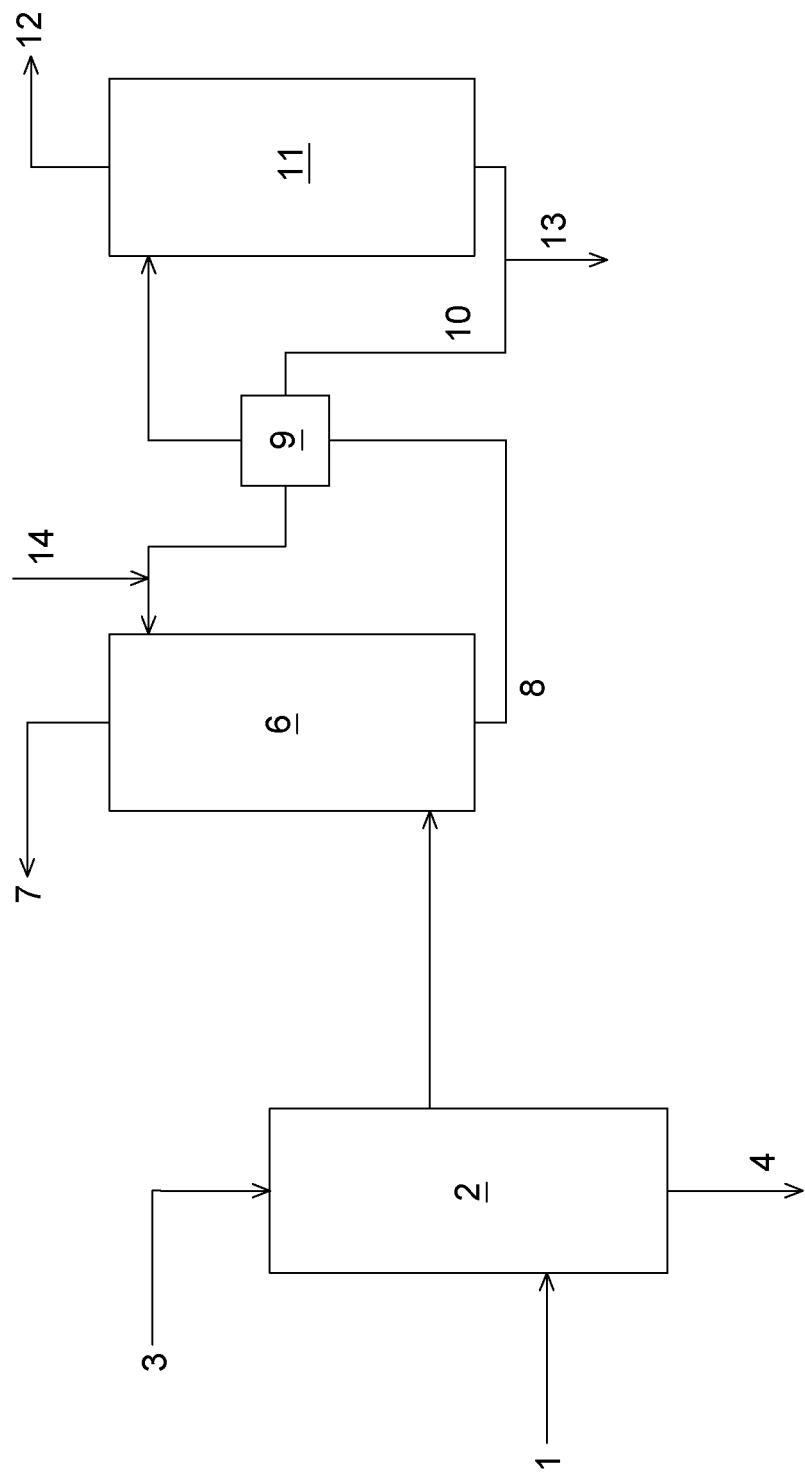
FIG. 1 (prior art) is a process diagram representing a conventional $CO_2$ capture process configuration where the flue gas is cooled down using a quench unit and then sent to the $CO_2$ capture unit. The absorption solution is bled to maintain adequate performance of the unit and fresh absorption solution is added to compensate for the bleed stream.

In a first aspect, the present process and system relates to the treatment of a gas comprising at least water vapour, CO$_2$ and SO$_x$, such as a flue gas, e.g. a post-combustion flue gas, to remove the SO$_x$ from the gas while cooling the gas in a single treatment unit. In a second aspect, the process and system relate to a treatment for removing CO$_2$ from a gas comprising at least water vapour, CO$_2$ and SO$_x$, involving a pre-treatment for removing SO$_x$ from the gas, before the CO$_2$ capture.

In the present description, the treatment unit for SO$_x$ removal may interchangeably be referred to as desulfurization unit, quench unit or quench tower. In one embodiment, the quench tower may consist in a contactor such as a packed column with random packing, a packed column with structured packing, a venturi, a barometric leg, an eductor, a spraying device, a demister pad, etc.

According to the present process and system, SO$_x$ represents the species SO$_2$ and SO$_3$. Water vapour represents water in gaseous form. The gas to be treated may further comprise nitrogen (N$_2$), oxygen (O$_2$), NO, NO$_2$, and/or H$_2$S, depending on the process from which the gas originates. In one embodiment, the gas may present a concentration in SO$_x$ of from about 10 to about 100 ppmv. In some cases, the gas may further comprise NO$_{x'}$. (x'=1 and/or 2). In one embodiment, the concentration in NO$_x$ in the gas may be of from about 10 to about 150 ppmv. In another embodiment, the gas may also comprise N$_2$, O$_2$ and/or other species including for example solid particles.

The term "about", as used herein before any numerical value, means within an acceptable error range for the particular value as determined by one of ordinary skill in the art. This error range may depend in part on how the value is measured or determined, i.e. the limitations of the measurement system. It is commonly accepted that a 10% precision measure is acceptable and encompasses the term "about".

A process and system for SO$_x$ capture from a combustion or flue gas according to the first aspect will now be described referring to FIG. 2. The combustion or flue gas (1) comprising at least H$_2$O (in gaseous form), CO$_2$ and SO$_x$ (x=2 and/or 3) is fed to a quench tower (2') in which it is contacted with an aqueous solution comprising a carbonate of an alkali metal (22).

In some embodiments, the aqueous solution comprising the alkali metal carbonate (22) may comprise sodium carbonate (Na$_2$CO$_3$) or potassium carbonate (K$_2$CO$_3$). In some embodiments, the alkali metal carbonate comprises K$_2$CO$_3$. The aqueous solution of the alkali metal carbonate (22) may further comprises the corresponding bicarbonate of the alkali metal. Hence, if stream (22) comprises K$_2$CO$_3$ as the alkali metal carbonate, it may also comprise potassium bicarbonate KHCO$_3$. The aqueous solution of the alkali metal carbonate (22) optionally comprising the corresponding alkali metal bicarbonate species, may be interchangeably referred to as an alkaline aqueous solution or an alkaline carbonate-containing solution. In one embodiment, the pH of the alkaline aqueous solution may be above 7 and up to about 9.5, or it may be above 7 and up to about 9. In another embodiment, the concentration in alkali metal carbonate in alkaline aqueous solution (22) may be from about 1 mM to about 1 M (the unit "M" corresponding to mol L⁻¹). In some embodiments, the concentration in alkali metal carbonate in alkaline aqueous solution (22) can be from about 1 mM to about 700 mM, 5 mM to about 500 mM, or 50 mM to about 250 mM.

The alkaline aqueous solution (22) sent to the quench tower for being contacted with the gas, generally has a temperature below the temperature of the gas. A cooling unit (18) may thus be provided upstream the quench tower (2') to cool the alkaline aqueous solution (22). Cooling unit (18) may comprise a heat exchanger in which cooled water is used as cooling fluid (streams 20, 21). In one embodiment, the temperature of the cooled alkaline aqueous solution may be from about 5° C. to about 60° C. In another embodiment, the cooled temperature alkaline aqueous solution can be from about 5° C. to about 50° C. In a further embodiment, the temperature of the cooled alkaline aqueous solution may be from about 10° C. to about 50° C. In another embodiment, the cooled alkaline aqueous solution may have a temperature that is from about 0° C. to about 200° C., from about 20° C. to about 150° C., or from about 50° C. to about 100° C., below the temperature of the gas.

The cooled alkaline aqueous solution (22) exiting the cooling unit is then fed to the quench tower (2'). In the quench tower (2'), the contact between the flue gas and the alkaline aqueous solution (22) results in a lowering of the gas temperature, removal of some water from the gas through water vapour condensation in the solution, as well as removal of the SO$_x$ from the gas by absorption in the alkaline aqueous solution. The contact between the flue gas and the solution (22) results in a clean, cooled SO$_x$-depleted gas (5) which may be sent to further treatment as required. For example, the cooled SO$_x$-depleted gas (5) may be sent to a CO$_2$ capture process to further remove CO$_2$ therefrom, as will be explained below in connection with the second aspect.

The solution (17) leaving the quench tower (2') thus contains absorbed SO$_x$ in the form of sulfate (SO$_4^{2-}$) and/or sulfite (SO$_3^{2-}$) ions and to some extent condensed water vapour. The pH of solution (17) is thus acidic, below 7. Solution (17) may thus be referred to as an acidic aqueous solution. Sulfate ions may be susceptible to precipitation in potassium carbonate absorption solution (where the alkali metal is K). However, because the water vapour condenses in the solution, the dilution effect may make precipitation unlikely. Solution (17) may also contain absorbed particles and/or ashes transported by the gas in the quench tower. It may be desirable to remove such particles and/or ashes. This may be done for example at the exit of the quench tower using a separator device (not shown in FIG. 2). In one embodiment, the separation device may comprise a radial vane separator, a Schoepentoeter device, a cyclone, venturi, a settling system, a filtration unit, etc. Additional treatment of the solution (17) can also be performed prior to recycling back into the quench tower (2') to modify its composition or other properties.

Figure 2:
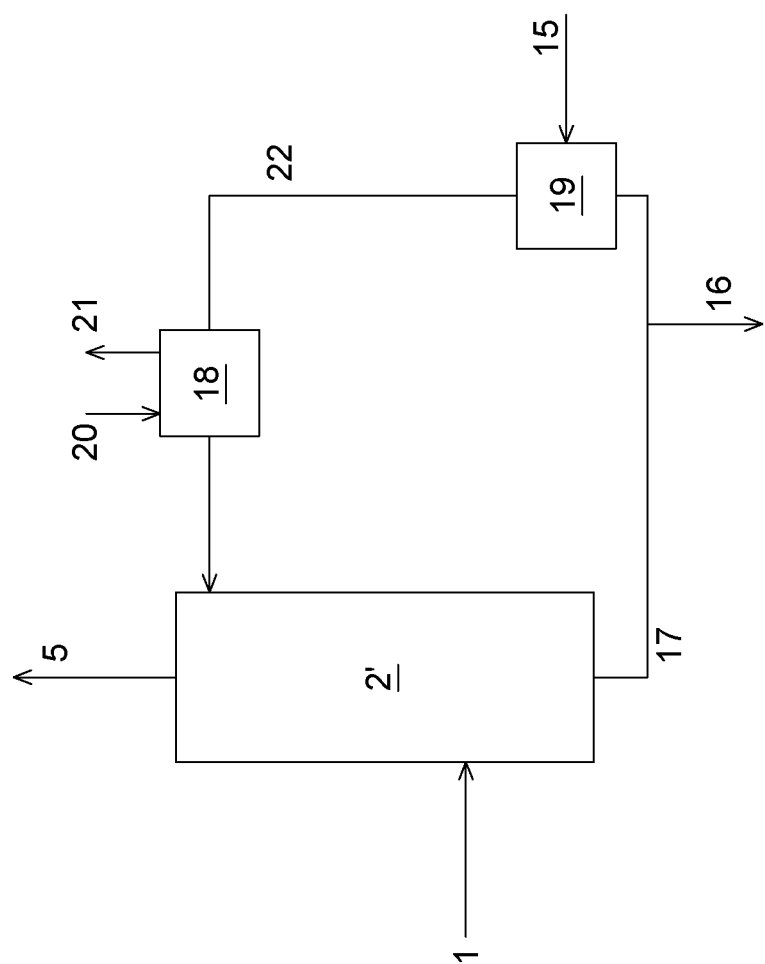
FIG. 2 is a process diagram representing a process for $SO_x$ capture from a flue gas according to an embodiment.

Still referring to FIG. 2, the acidic aqueous solution (17) is then sent to a mixing unit (19) wherein it is mixed with some alkali metal carbonate and optionally the corresponding bicarbonate (15). The alkali metal carbonate may be added to the acidic aqueous solution (17) in a solid form or in solution in water. In one embodiment, the alkali metal carbonate is added to the acidic aqueous solution, in solution in water. In another embodiment, the solution in water of the alkali metal (15) may be derived from a CO$_2$-capture process, for example it may be an absorption solution bleed derived from a CO$_2$-capture process, as will be further detailed below in connection with the second aspect. Upon mixing the acidic solution (17) with the alkali metal carbonate, the pH of the solution is increased above 7, resulting in the alkaline aqueous solution (22), which is then returned to the cooler (18) and then the quench tower (2') for further gas desulfurization. Regarding the mixer (19), it should be noted that it can have various constructions and configurations, such as a Tee pipe joint, a stirred tank mixer, or various other types of mixers, depending on the form of the make-up alkali metal carbonate being added as well as other process factors.

The desulfurization system also includes a purge line (16) that is provided for purging a portion of the acidic aqueous solution (17) exiting the quench tower (2'), so as to maintain a mass balance of the desulfurization process. In one embodiment, purging may be performed at a flowrate determined by a water vapour condensation rate and an alkaline aqueous solution flowrate. A level sensor (not shown) may further be provided upstream of the purge line to detect the level of liquid in the system and allow controlling the purge line flow. The purging of a portion of the acidic aqueous solution may be performed continuously or periodically.

A process and system for $CO_2$ capture from a combustion or flue gas involving a pre-treatment for removing $SO_x$ from the gas, according to the second aspect will now be described referring to FIG. 3.

Figure 3:
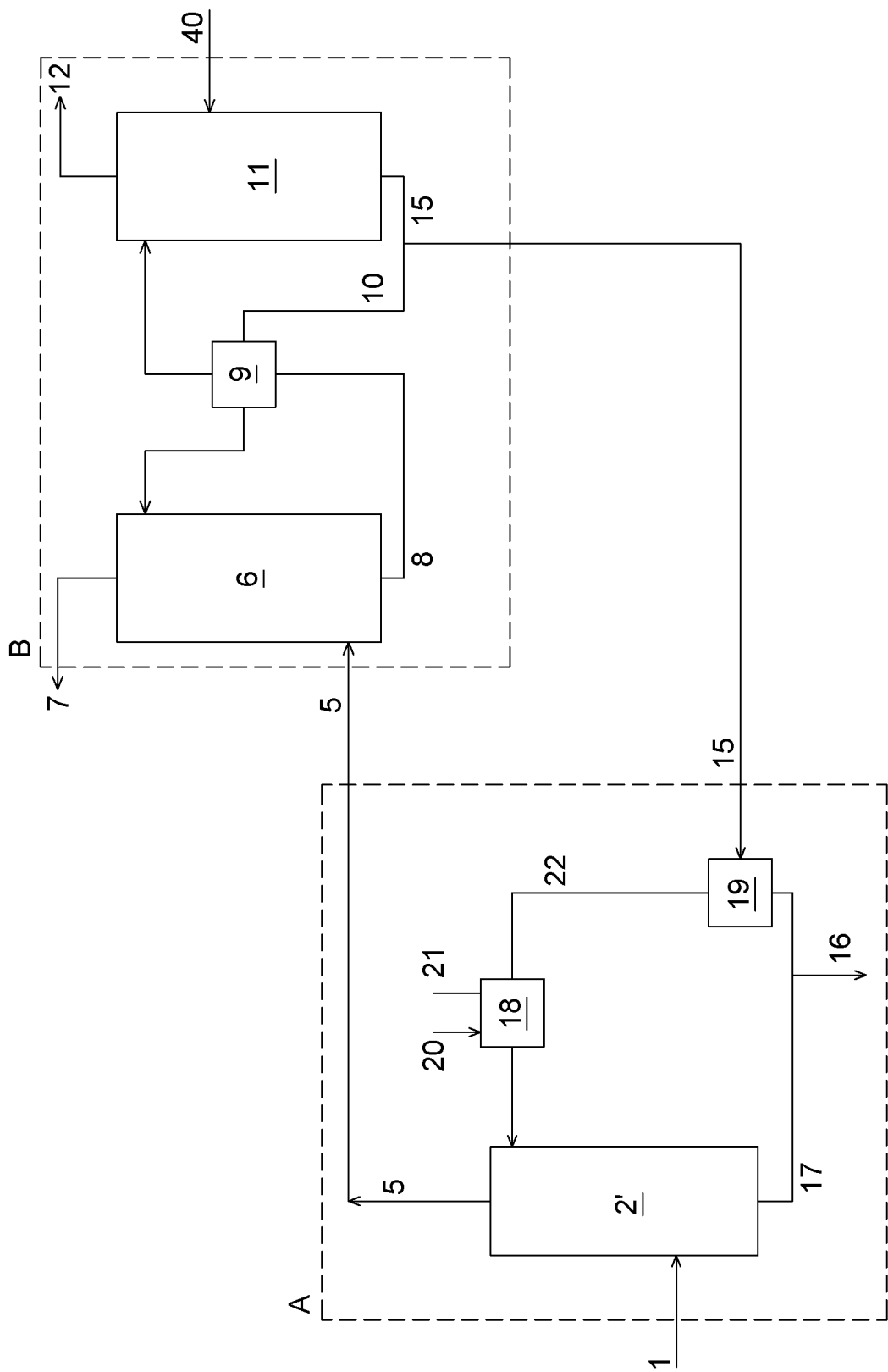
FIG. 3 is a process diagram representing a process for treating a flue gas showing the integration of a pre-treatment loop wherein the gas is cooled and desulfurized, with a $CO_2$ capture loop for removing $CO_2$ from the desulfurized gas, according to an embodiment.

In FIG. 3, the pre-treatment loop (A) wherein the gas is cooled and desulfurized, substantially corresponds to the desulfurization process/system previously described with respect to the first aspect. Hence, the features of the various streams and units previously described in reference to FIG. 2 may also be considered in relation with pre-treatment loop (A) of FIG. 3. This includes, for instance, the features of the components in the streams, their temperatures, concentrations, pH etc., as well as the features of the quench unit, mixing unit, separation device, cooling unit, level sensor etc.

The pre-treatment loop (A) thus comprises sending gas (1) comprising water vapour, $CO_2$ and $SO_x$, and optionally other species such as $NO_x$, to the quench unit (2'). In the quench unit (2') the gas is cooled to a temperature suitable for the subsequent $CO_2$ capture unit, some water vapour is condensed as a liquid stream, and a fraction of the $SO_x$ present in the gas is removed. Cooling of the gas and $SO_x$ removal may be obtained through contacting the gas with alkaline aqueous solution (22), which has been cooled in cooling unit (18) prior to its entrance in the quench unit (2'). As a result of contacting the flue gas, the alkaline aqueous solution is warmed, and its water content is increased due to the water vapour condensation. In addition, its pH is decreased due to the absorption of the $SO_x$ in the solution. The acidic aqueous stream (17) leaving the quench unit is sent to mixing unit (19) where it is mixed with absorption solution bleed stream (15) of the absorption loop (B), also referred to as $CO_2$ capture loop. The absorption solution bleed stream (15) comprises alkali metal carbonate and bicarbonate in solution. Hence, upon mixing the acidic aqueous stream (17) with the bleed stream (15), the pH of the resulting solution increases, resulting in an alkaline aqueous solution, which is returned as stream (22) towards cooler (18). The $SO_x$-depleted gas (5) leaving the quench unit with a lower temperature and a lower $SO_x$ concentration is sent to the absorption loop (B). The mass balance of the pre-treatment loop (A) may be obtained using the purge line (16). In one embodiment, purging may be performed at a flowrate determined by a water vapour condensation rate and a flowrate of absorption solution bleed (15). It should be noted that the $SO_x$-depleted gas (5) could also be subjected to additional pre-treatments prior to entering the absorption loop (B), if desired.

Figure 6:
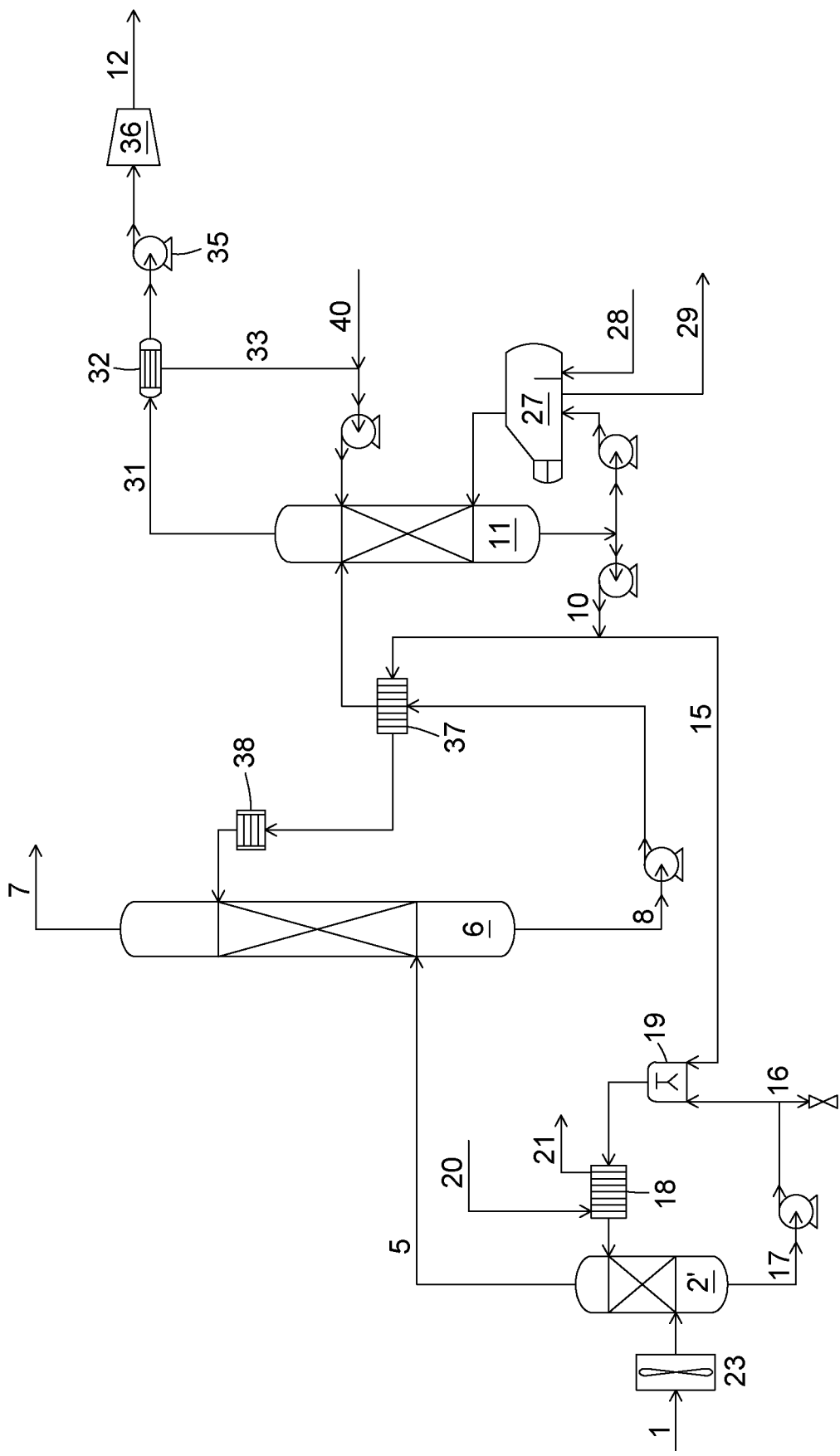
FIG. 6 is a process flow diagram representing a process for treating a flue gas showing the integration of the $SO_x$ removal pre-treatment loop with the $CO_2$ capture loop, according to an embodiment.

The absorption solution bleed stream (15) can be taken from various points in the absorption loop (B). In FIGS. 3 and 6 the absorption solution bleed stream (15) is taken off of the regenerated solution exiting the bottom of the stripping unit. However, the absorption solution bleed stream could be taken from other streams of the absorption loop (B), such as the absorption solution (10) exiting the heat exchanger (9) and which is thus cooler than the regenerated solution exiting the bottom of the stripping unit. The absorption solution bleed stream could be taken from a $CO_2$-loaded stream, such as the loaded stream (8) exiting the absorption unit or the loaded stream exiting the heat exchanger prior to entering the stripping unit (11). Thus, the absorption solution bleed stream can be taken from the loaded or lean streams in the absorption loop, or could be a combination of such streams.

The absorption loop (B) as shown in FIG. 3, may comprise an absorption unit (6) in which the $SO_x$-depleted gas (5), which contains $CO_2$, may be treated for removing $CO_2$ therefrom. Conventional absorbers known in the field may be used as the absorption unit (6). For instance, the $CO_2$ absorption unit may be a bubble column, a spray scrubber, a packed column with structured packing or a packed column with random packing, a rotating packed bed, or others. In the absorption unit (6), $CO_2$ is absorbed in an absorption solution comprising water and a carbonate of an alkali metal resulting in the production of a $CO_2$-depleted gas (7) and a carbonate and bicarbonate-rich absorption solution (8) or simply "rich absorption solution" (8). The flue gas with a lower $CO_2$ content (7) is discharged at the top of the absorption unit to the atmosphere or it is sent to another downstream process.

In one embodiment, the alkali metal may be sodium or potassium. If the alkali metal is potassium, the absorption solution would thus comprise potassium carbonate and water. In one embodiment, the absorption solution used in the $CO_2$ capture unit may have a concentration of from about 1 M to about 5 M. It is also noted that the potassium carbonate absorption solution could include additional chemical compounds and/or catalysts. The additional chemical compounds and/or catalysts can include promoters that accelerate $CO_2$ absorption and/or provide other benefits to absorption or desorption performance. Examples of additional chemical compounds that can be present in the absorption solution are amino acids or salts or derivatives thereof, amines, inorganic additives, and/or other absorbent promoters.

In another embodiment, the $CO_2$ capture in the absorption unit (6) may be performed in the presence of an enzyme catalyzing the $CO_2$ hydration such as a carbonic anhydrase (CA) or an analogue thereof. Hence, in the absorption unit (6), $CO_2$ may dissolve in the absorption solution, which may contain the CA, and then reacts with the hydroxide ions (Equation 8) and water (Equations 9 and 10). The CA-catalyzed $CO_2$ hydration reaction (Equation 10) is the dominant reaction in the process.

$$CO_2 + OH^- \rightarrow HCO_3^- \qquad \text{Equation 8}$$

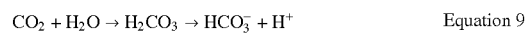

$$CO_2 + H_2O \rightarrow H_2CO_3 \rightarrow HCO_3^- + H^+ \qquad \text{Equation 9}$$

$$CO_2 + H_2O \overset{CA}{\rightleftarrows} HCO_3^- + H^+. \qquad \text{Equation 10}$$

The carbonic anhydrase which may be used to enhance $CO_2$ capture, may be from human, bacterial, fungal or other organism origins, having thermostable or other stability properties, as long as the carbonic anhydrase or analogue thereof can catalyze the hydration of the carbon dioxide to form hydrogen and bicarbonate. It should also be noted that "carbonic anhydrase or an analogue thereof" as used herein includes naturally occurring, modified, recombinant and/or synthetic enzymes including chemically modified enzymes, enzyme aggregates, cross-linked enzymes, enzyme particles, enzyme-polymer complexes, polypeptide fragments, enzyme-like chemicals such as small molecules mimicking the active site of carbonic anhydrase enzymes and any other functional analogue of the enzyme carbonic anhydrase.

The enzyme carbonic anhydrase may have a molecular weight up to about 100,000 daltons. In another embodiment, the carbonic anhydrase can be of relatively low molecular weight (e.g. 30,000 daltons).

The carbonic anhydrase or analogue thereof may be provided in various ways. It may be supported on or in particles that flow with the solution, directly bonded to the surface of particles, entrapped inside or fixed to a porous support material matrix, entrapped inside or fixed to a porous coating material that is provided around a support particle that is itself porous or non-porous, or present as crosslinked enzyme aggregates (CLEA) or crosslinked enzyme crystals (CLEC). The enzymes may be provided immobilized within the reactor itself (e.g., on packing), or may be free in the solution. When the CA is used in association with particles that flow in solution, the enzymatic particles can be prepared by various immobilization techniques and then deployed in the system. When the CA is used in non-immobilized form, it can be added in powder form, enzyme-solution form, or enzyme dispersion form, into the absorption solution where it can become a soluble part of the absorption solution.

In one embodiment, the CA enzyme concentration may be below 0.1% by weight of the absorption solution. In other examples, the CA enzyme concentration can be above this value, depending on various factors such as process design, enzyme activity and enzyme stability.

Still referring to FIG. 3, the carbonate and bicarbonate-rich absorption solution (8) may be fed to a stripping unit (11). Stripping unit (11), which can also be called a desorption unit or a regeneration unit, may serve for the regeneration of the absorption solution and the recovery of the $CO_2$ as a gas (12). In one embodiment, the carbonate and bicarbonate-rich absorption solution (8) may be heated by passing through a heat exchanger (9) before being sent to the stripper (11). In the stripping unit (11), the rich absorption solution (8) may flow downwards by gravity while contacting a stripping gas which may consist of water vapour at a temperature ranging, for instance, between 60° C. and 85° C. The stripping unit may be operated under a partial vacuum to allow for this low temperature range. A vacuum pump may be used for this purpose. The composition of the stripping gas may be such that the dissolved $CO_2$ may be released from the liquid phase and consequently bicarbonate ions transformed back into dissolved $CO_2$ (Equation 11) and then into gaseous $CO_2$, which may be released as stream (12). The stripping gas is preferably obtained by passing a portion of the solution through a reboiler and generating the stripping gas (see FIG. 6, for example), although other methods of providing a stripping gas can also be used.

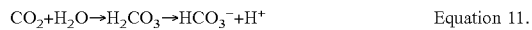

$$CO_2 + H_2O \rightarrow H_2CO_3 \rightarrow HCO_3^- + H^+ \qquad \text{Equation 11.}$$

CA may also be present in the stripping unit and may catalyze the transformation of the bicarbonate ions into dissolved $CO_2$ (Equation 10). The absorption solution, now made lean in $CO_2$, leaving the stripping unit and referred to as a carbonate and bicarbonate-lean absorption solution (10) or simply "lean absorption solution" (10) may be pumped and cooled down by passing through the heat exchanger (9) and fed back into the top of the absorption unit (6). A fraction of the carbonate and bicarbonate-lean absorption solution (10) is sent to pre-treatment loop (A) as an absorption bleed stream (15).

Under the complete absorption/stripping cycle, the CA enzyme may be exposed to a pH ranging between about 9 and about 10. The gas (12) leaving the stripping unit, comprising water vapour and gaseous $CO_2$, may be sent to a condenser. Once condensed, the water may then be sent back to the stripping unit and the $CO_2$ may be recovered for future use. To maintain the water mass balance, water may be added to the absorption loop (B) through stream (40). When additives (e.g., catalysts such as enzymes, promoters, etc.) are used in the absorption solution, make-up of such additives can be provided via a make-up line at various points in the process.

As previously explained, when the gas to be treated contains $NO_x$ species, the $NO_x$ can be absorbed by the absorption solution and transformed in nitrite/nitrate ions in solutions as shown in Equations 5, 6 and 7. Over time, the absorption solution in the absorption loop (B) may become richer in nitrite and nitrate ions. The absorption solution bleed (15) flow rate may be adjusted to maintain concentration levels adequate to maintain a continuous optimal $CO_2$ capture performance.

The present $CO_2$ capture process and system may present various advantages. First, no separate desulfurization unit may be required for $SO_x$ removal prior to $CO_2$ capture. Indeed, both desulfurization and cooling of the gas can be performed in the same process unit instead of several process units. This allows reducing costs and is economically beneficial. Secondly, the present process/system recycles a waste stream (i.e., the absorption solution bleed stream) to pre-treat the gas and selectively remove contaminants, such as $SO_x$. Further, the use of carbonate absorption solution in the main absorption loop can be reduced thanks to the present process/system. These features may reduce the environmental impact of the process and the operating costs associated with the consumption of the absorption solution. Also, removal of $SO_x$ from the gas stream in the pre-treatment loop generates sulfates, a desirable by-product which may be used in fertilisers.

The present process and system may also limit the impact of $SO_x$ and $NO_x$ (if the gas contains such species) on the $CO_2$ capture performance. Thanks to the pre-treatment step to remove the $SO_x$, it may be possible to minimize the sulfate ion concentration in the absorption solution. The nitrate and/or nitrite levels of the absorption loop may further be controlled and reduced. The present process/system also takes advantage of the different absorbing rates of the sulfidation and nitrification reactions in the carbonate absorption solution. More particularly, since the absorption solution bleed at its nitrification threshold point, still has a high absorption capacity, it can be used to selectively absorb sulfates from the gas stream impurities. More specifically, the absorption solution bleed can be mixed or combined with the solution used to cool the flue gas in the quench unit, resulting in a high $SO_x$ removal efficiency, which translates into a much lower concentration of sulfate ions in the absorption solution of the $CO_2$ capture unit, which in turn positively impacts bleed flow rates, enzyme and absorption solution make-up rates by considerably decreasing them. The driving force behind the $SO_x$ capture is the pH of the treatment solution in the pre-treatment loop. During standard operation, the aqueous solution is acidic because of the reaction with $CO_2$, $SO_x$ and $NO_x$. However, by adding the absorption solution bleed, which has a pH over 9, the pre-treatment loop solution becomes alkaline and may further absorb $SO_x$ and $NO_x$. This results in a better process performance because the waste disposal and correspondingly the input of fresh solution may be considerably decreased. This reduces the environmental impact of the process and the operation costs associated with the consumption of the absorption solution.

All the documents mentioned in the present description are incorporated herein by reference.

EXAMPLES AND EXPERIMENTATION

The following examples illustrate different aspects of the process and system described herein. For this purpose, Protreat® simulator was used to perform mass and energy balances as well as design of the packed bed columns. Protreat® is a state-of-the-art rate-based simulator for gas treating marketed by Optimized Gas Treating Inc. (OGT) of Houston, Tex. This simulator was implemented with a kinetic module to represent the catalytic effect of carbonic anhydrase's enzyme in a $K_2CO_3/KHCO_3$ absorption solution on $CO_2$ capture.

Example 1 (Comparative Example): Description of 100 Tonnes Per Day (Tpd) $CO_2$ Capture Unit Using an Enzyme Based Solution without $SO_x$ Removal A $CO_2$ capture process is used to remove 90% of $CO_2$ present in a flue gas. The flue gas composition is given in Table 1. To take into account the fact that $SO_x$ and $NO_x$ concentration can vary depending on the flue gas source, their concentrations were changed according to the indicated concentration range in the Table 1. In the present example, $SO_x$ consisted of $SO_2$ only, and $SO_x$ removal was considered equivalent to $SO_2$ removal.

TABLE 1

Inlet Gas Parameters

| Parameter | 100 tpd Case |
| --- | --- |
| Flow (kg/h) | 46-300 |
| Temperature (° C.) | 70 |
| Pressure (kPa) | 102 |
| $H_2O$ (mol %) | 18.0 |
| $CO_2$ (mol %) | 8.2 |
| $SO_2$ (ppmv*) | 10-100 |
| $N_2$ (mol %) | 70.5 |
| $O_2$ (mol %) | 2.5 |
| Ar (mol %) | 0.5 |
| $NO_x$ (ppmv) | 10-150 |

(*1 ppmv = 1 μL/L)

Figure 4:
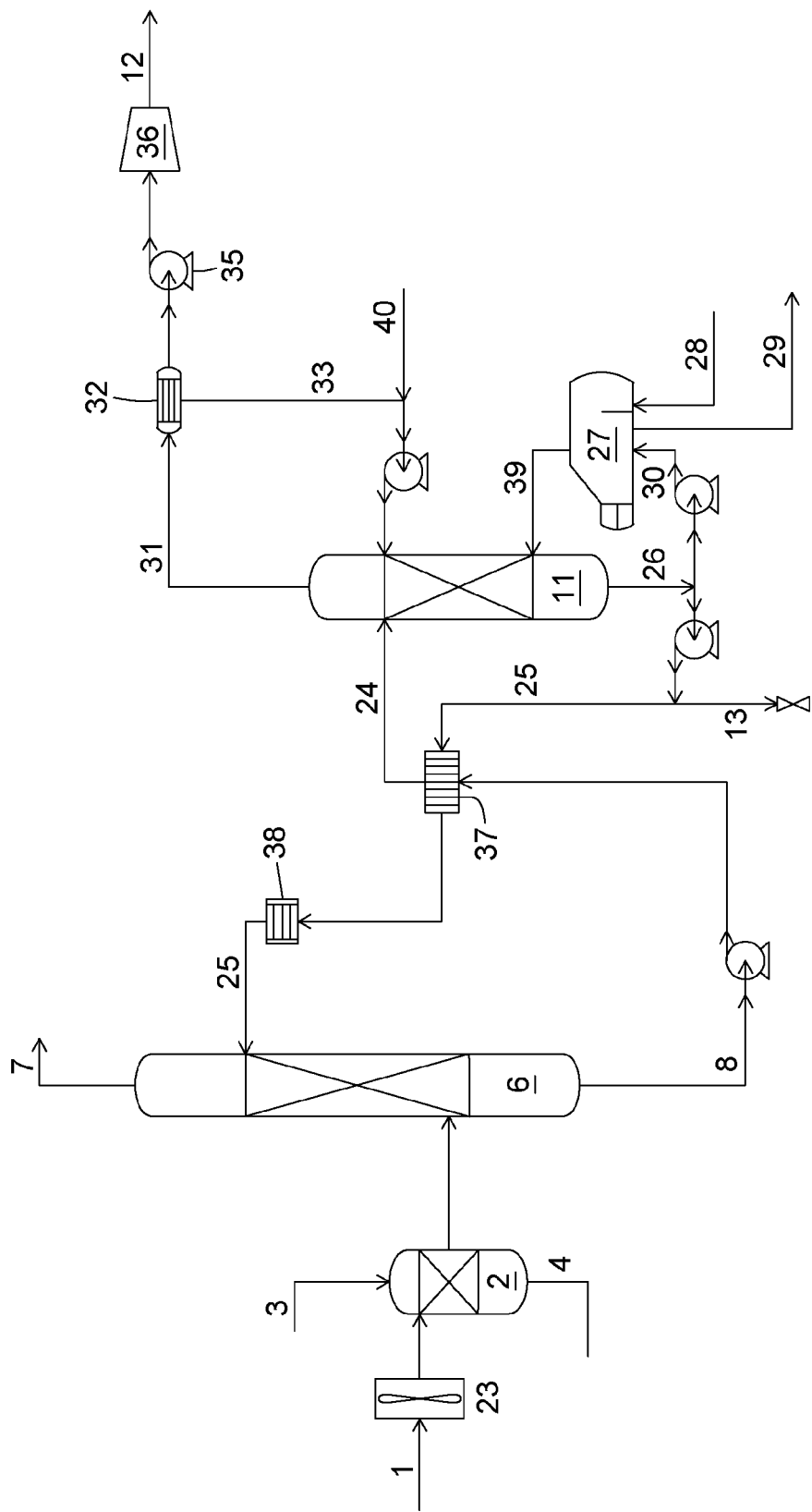
FIG. 4 is a process flow diagram of a process for removing $CO_2$ from a flue gas based on the use of a potassium carbonate solution as the absorption solution.

The $CO_2$ capture process considered for the process simulations is shown in FIG. 4 and is further described below.

The flue gas (1), having a composition shown in Table 1, is directed to a cooling unit (2) having a packed column configuration, using a blower (23). The flue gas is cooled with water at a desirable temperature for the process which is 30° C. for the present example. The water stream leaving the cooling tower is then sent to a cooling system (not shown) and then sent back to the cooling unit (2). The cooled flue gas, at a temperature of 30° C., is then sent to the packed column absorber unit (6). The flue gas enters at the bottom of the packed column and flows upwards and contacts an aqueous absorption solution (25), going downwards by gravity. The absorption solution (25) comprises potassium carbonate, potassium bicarbonate and the enzyme carbonic anhydrase (CA). The potassium concentration in the solution is 2.9 M. The concentrations in carbonate and bicarbonate ions depend on the absorption and stripping process conditions. The CA enzyme concentration is below 0.1% by weight of the absorption solution. $CO_2$ dissolves in the solution and then reacts with the hydroxide ions (equation 8) and water (equations 9 and 10).

The CA-catalyzed $CO_2$ hydration reaction (equation 10) is the dominant reaction in the process. The fast enzymatic reaction enables a maximum concentration gradient across the gas/liquid interface and results in a maximum $CO_2$ transfer rate from the gas phase to the liquid phase, and, consequently in a high $CO_2$ capture performance. The flue gas with a lower $CO_2$ content (7) is discharged at the top of the absorber to the atmosphere or it is sent to another downstream process.

Afterwards, the absorption solution containing $CO_2$ in the form of bicarbonate ions (8), also referred to as the rich absorption solution, is pumped and heated by passing through a heat exchanger (37) and then fed at the top of the stripper (11) as stream (24). The solution flows downwards by gravity while contacting a stripping gas (39) consisting of water vapour at a temperature ranging between 60 and 85° C. The stripper is operated under a partial vacuum to allow for this low temperature range to work, a vacuum pump (35) is used for this purpose. The composition of the stripping gas is such that the dissolved $CO_2$ is released from the liquid phase and consequently bicarbonate ions are transformed back into dissolved $CO_2$ (equation 11) and then into gaseous $CO_2$.

CA is also present in the stripper and catalyzes the transformation of the bicarbonate ions into dissolved $CO_2$ (equation 10). The absorption solution, now made lean in $CO_2$, leaves the stripper at its bottom (26). A fraction of the absorption solution is pumped as solution (30) towards the reboiler (27) where water is evaporated and then sent back to the stripper as the stripping gas (39). The energy for water evaporation is provided using waste heat coming from the plant where the capture unit is implemented. Waste heat may for example be supplied using hot water (28) (e.g. at a temperature above 80° C.). The absorption solution (25) is then pumped and cooled down by passing through the heat exchanger (37) and the cooler (38) and is fed back into the top of the absorber unit (6). Under the complete absorption/stripping cycle, the enzyme is exposed to a pH ranging between 9 and 10. The gas leaving the stripper (31), consisting of water vapour and gaseous $CO_2$, is sent to a condenser (32). Once condensed, the water (33) is then sent back to the stripper and the $CO_2$ is sent from the vacuum pump (35) to the mechanical compression unit (36) for future use. To maintain the water mass balance, water is added to the process through stream (40).

As the $SO_4^{2-}$ concentration level approaches the maximum concentration level, and to avoid any $K_2SO_4$ precipitation, a fraction of the absorption solution is bled and sent toward the cooling tower (2) as described above. This sulfate concentration level leading to the precipitation is dependent on the composition of the absorption solution and more specifically to the potassium ion concentration in the solution.

Process simulations were conducted to determine the composition of the absorption solution bleed stream required to maintain the $SO_4^{-2}$ ion concentration level at a maximum concentration of 0.125 M and avoid $K_2SO_4$ precipitation in a $K_2CO_3$ absorption solution. The reasons for this were explained above. It was experimentally determined that under the process conditions $K_2SO_4$ precipitation is present when the sulfate ion concentration is close to 0.15 M.

For a flue gas of Table 1 containing 10 ppmv $SO_2$ and 10 ppmv $NO_x$, the absorption solution bleed composition (stream (13)) were determined for two absorption solutions compositions: 17 and 45 wt % $K_2CO_3$. Results are provided in Table 2. For both cases, the bleed flow rate is 0.092 m$^3$/h and the bleed flow temperature is 65° C. $SO_2$ removal in the cooling unit is less than 1% under these conditions.

TABLE 2

Absorption Solution Bleed Composition

| Parameter | $K_2CO_3$ concentration | |
| --- | --- | --- |
| | 17 wt. % | 45 wt. % |
| $K_2CO_3$ (M) | 0.87 | 2.88 |
| $KHCO_3$ (M) | 1.16 | 3.84 |
| Enzyme (gL$^{-1}$) | 0.5 | 0.5 |
| $SO_4^{2-}$ (M) | 0.125 | 0.125 |

Figure 5:
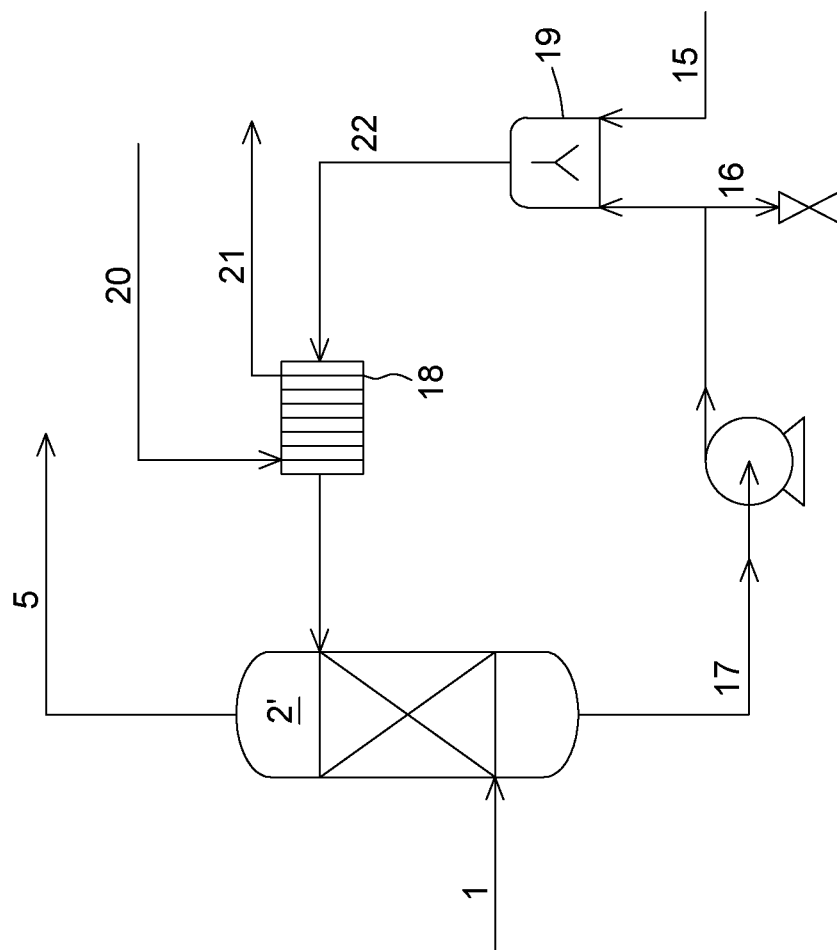
FIG. 5 is a process flow diagram representing the $SO_x$ removal pre-treatment loop used for process simulations, according to an embodiment.

Example 2: Description of 100 Tonnes Per Day $CO_2$ Capture Unit Using an Enzyme Based Solution Comprising a $SO_x$ Removal in a Pre-Treatment Loop In the present example, it is considered that a pre-treatment loop is added to the $CO_2$ capture unit described in Example 1 in the configuration previously shown in FIG. 3. A simple simulation was designed to emulate a pre-treatment loop for absorption solution bleed valuation (see FIG. 5). The complete process is as shown in FIG. 6. For the demonstration purpose, the treatment unit or «quench tower» is a packed column. The quench tower is operated at atmospheric pressure. The liquid is circulated using a centrifugal pump. The liquid flowrate in the purge line is equivalent to the flue gas water vapour condensation rate and the absorption solution bleed flow rate.

As a first simulation, the flue gas of Table 1 was considered, where the $NO_x$ and $SO_2$ concentrations were set at 10 ppmv. This enables a direct evaluation of the impact of the pre-treatment loop on the absorption solution bleed flow rate by comparing with the value obtained in Example 1 which is 0.092 m$^3$/h. As a base case, the simulation was run considering a 5 m quench tower and a pre-treatment loop flow rate of 200 m$^3$/h. The quench tower is operated at 70% flooding and at a temperature of 30° C. so that the flue gas entering the absorber of the absorption loop is at a temperature of 30° C. $CO_2$ capture process conditions were as described in Example 1 (except for what concerns the use of the bleed stream for $SO_x$ removal) where the absorption solution is 17% wt $K_2CO_3$. The simulations were first started by considering the bleed flow rate determined in Example 1 and were then conducted iteratively until the bleed flow rate converged.

The simulations indicated that by using the absorption solution bleed stream for $SO_2$ removal, the bleed stream flow rate was decreased from 0.092 down to 0.012 m$^3$/h. This represents an 8-fold decrease of the bleed flow rate relative to the case without $SO_x$ treatment when the absorption solution is 17% wt $K_2CO_3$. As demonstrated in Table 3, the solution entering the cooling unit (2) in Example 1 according to a conventional process, has an acidic pH of 4.42 which does not permit $SO_2$ capture (less than 1%). However, by adding the absorption solution bled from the absorption loop to the acidic aqueous solution exiting the quench tower (2'), the flow becomes an alkaline solution with pH of 7.78 which promotes $SO_x$ capture. In this case, $SO_2$ removal is 85%.

TABLE 3

Solution inlet to cooling/quench unit when the $CO_2$ absorption solution is 17 wt % $K_2CO_3$ and the flue gas contains 10 ppmv $NO_x$ and 10 ppm $SO_2$

| | Solution composition (mol fraction) | |
| --- | --- | --- |
| | Cooling only | $SO_2$ removal |
| Water | 1.00E + 00 | 9.99E − 01 |
| $KHCO_3$ | 1.25E − 04 | 3.67E − 04 |
| Sulfur Dioxide | 1.44E − 05 | 1.09E − 04 |
| $K_2CO_3$ | 7.39E − 07 | 5.51E − 04 |
| Enzyme | 1.18E − 08 | 2.37E − 07 |
| Nitrogen | 2.92E − 06 | 6.42E − 06 |
| Nitric Oxide | 5.56E − 09 | 1.96E − 10 |
| Oxygen | 1.48E − 06 | 4.16E − 07 |
| Argon | 3.19E − 07 | 8.97E − 08 |
| Nitrogen Dioxide | 9.09E − 10 | 2.57E − 10 |
| pH | 4.42 | 7.78 |

In the same system, it was also determined that if instead of having an absorption solution bleed stream at the exit of the stripper (where the solution is $CO_2$ lean or has a lean loading) one would use the solution at the entrance of the stripper (where the solution is $CO_2$ rich or has a rich loading), there is no impact on the process water composition and $SO_2$ removal performance in the quench unit (Table 4). The loading definition is based on the conversion of $K_2CO_3$ to $KHCO_3$. A loading of 0.0 will mean that all the carbon is under the form of $K_2CO_3$. A loading of 0.5, or conversion of 50%, will mean that half the $K_2CO_3$ has reacted to the $KHCO_3$ form. A loading of 1.0 will mean that all the carbon is present under the $KHCO_3$ form. This finding indicates that the bleed stream can be taken from various points in the absorption loop, where the absorption solution may be rich or lean, for desulfurization.

TABLE 4

Impact of $CO_2$ loading of the absorption solution bleed on the $SO_x$ removal performance

| | | Lean Loading 0.4 | Rich Loading 0.7 |
| --- | --- | --- | --- |
| Quench Tower Diameter | (m) | 3.1 | 3.1 |
| $CO_2$ removal | (%) | 0.04 | 0.00 |
| $SO_2$ removal | (%) | 86.56 | 86.56 |
| [$K_2CO_3$] in solution out quench | (mmolL$^{-1}$) | 28.829 | 28.832 |
| Solution temperature out quench | (° C.) | 45 | 45 |
| pH of solution in quench | | 7.7 | 7.7 |

The $SO_x$ removal performance of the quench unit was also evaluated for different scenarios by varying:

Quench tower height;

$NO_x$ and $SO_2$ concentration in the flue gas;

Temperature of the solution entering the quench unit;

Absorption solution bleed flow rate;

Potassium carbonate concentration; and

Lean or rich absorption solution used for the bleed.

Figure 7:
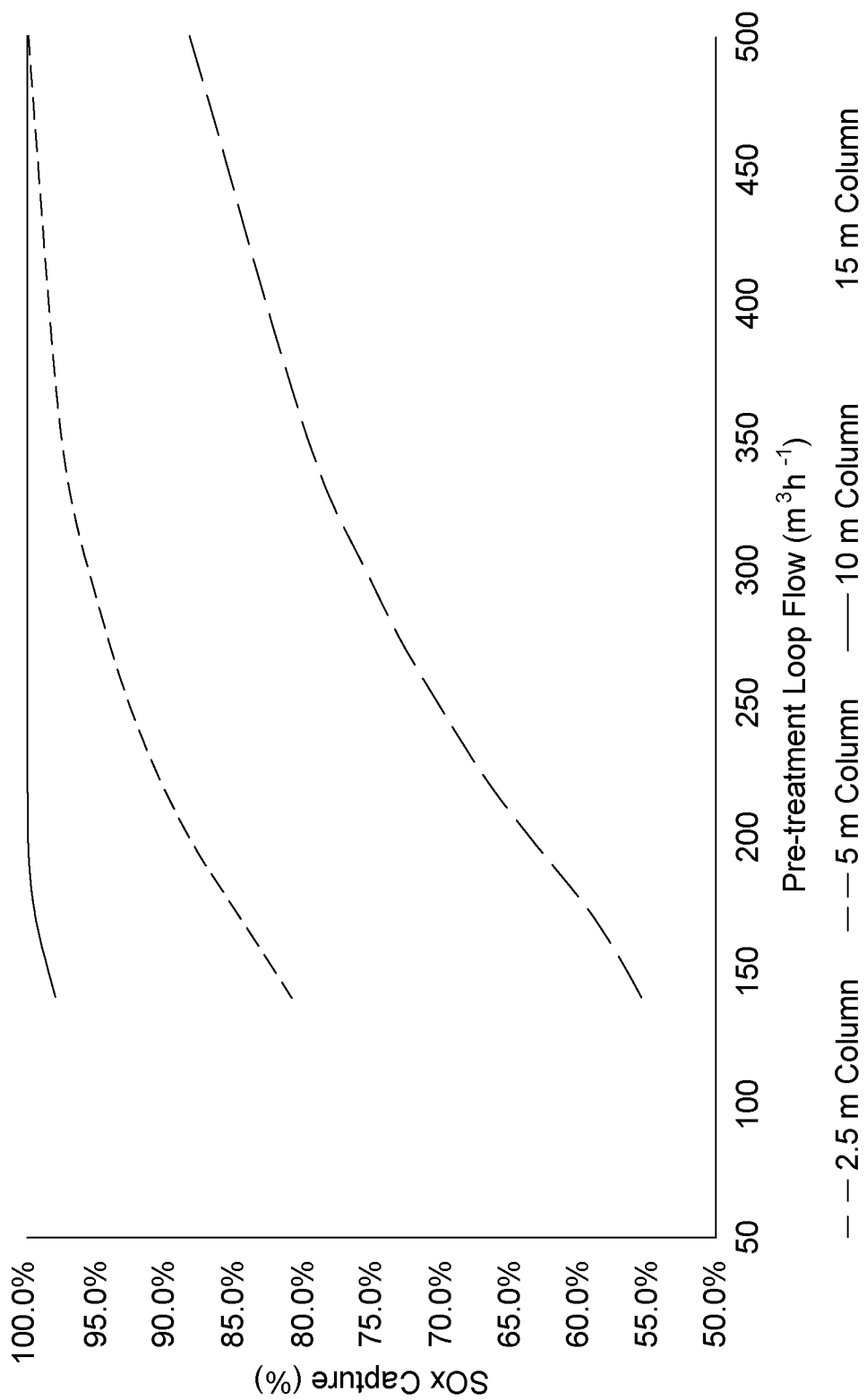
FIG. 7 is a graph representing the impact of column height and pre-treatment loop flow rate on the $SO_x$ capture. Process conditions are: absorption solution bleed flow rate of 0.092 $m^3h^{-1}$, column flooding maintained at 70%, absorption solution bleed at 17 wt % $K_2CO_3$, temperature of the pre-treatment loop flow at 30° C.

Example 3: Impact of Quench Tower Height and Pre-Treatment Loop Flow Rate (Flow Rate into Quench Unit) on the Performance of the $SO_2$ Removal Unit Required for a 100 Tpd $CO_2$ Capture Plant To determine how the $SO_x$ removal unit performance was impacted by quench tower height and pre-treatment loop flow rate, simulations were conducted by varying the column height from 2.5 to 15 m and the pre-treatment loop flow rate from 140 to 500 m³/h. The absorption solution bleed flow rate was set at 0.092 m³/h (value of Example 1) with the bleed composition presented in Table 2 for a 17% wt $K_2CO_3$ absorption solution at a temperature of 65° C. The pre-treatment loop flow temperature was fixed at 30° C. and quench tower was operated at 70% flooding. The flue gas of Table 1 was considered where the $NO_x$ and $SO_2$ concentrations were set at 10 ppmv. The results are shown in FIG. 7 and Tables 5-8.

TABLE 5

Quench tower of 2.5 m

| Pre-treatment loop flow rate | (m³·h⁻¹) | 140 | 170 | 200 | 230 | 260 | 290 | 350 | 500 |
|---|---|---|---|---|---|---|---|---|---|
| Quench Tower Diameter | (m) | 3.1 | 3.1 | 3.2 | 3.2 | 3.3 | 3.3 | 3.4 | 3.5 |
| $CO_2$ removal | (%) | 0.04 | 0.04 | 0.04 | 0.04 | 0.04 | 0.04 | 0.04 | 0.04 |
| $SO_2$ removal | | 55.4 | 58.9 | 63.6 | 67.7 | 71.3 | 74.4 | 79.7 | 88.19 |
| [$K_2CO_3$] in solution out quench | (mmolL⁻¹) | 13.3 | 13.3 | 13.4 | 13.5 | 13.5 | 13.5 | 13.4 | 12.5 |
| Solution temperature out quench | (° C.) | 69 | 62 | 58 | 54 | 52 | 49 | 46 | 41 |
| pH solution inlet quench | | 7.59 | 7.53 | 7.48 | 7.45 | 7.42 | 7.39 | 7.36 | 7.28 |

TABLE 6

Quench tower of 5 m

| Pre-treatment loop flow rate | (m³·h⁻¹) | 140 | 170 | 200 | 230 | 260 | 290 | 350 | 500 |
|---|---|---|---|---|---|---|---|---|---|
| Quench Tower Diameter | (m) | 3.1 | 3.1 | 3.2 | 3.2 | 3.2 | 3.3 | 3.4 | 3.5 |
| $CO_2$ removal | (%) | 0.04 | 0.04 | 0.04 | 0.04 | 0.04 | 0.04 | 0.04 | 0.04 |
| $SO_2$ removal | | 80.8 | 84.6 | 88.2 | 91.1 | 93.3 | 95.0 | 97.5 | 99.9 |
| [$K_2CO_3$] in solution out quench | (mmolL⁻¹) | 13.3 | 13.4 | 13.4 | 13.5 | 13.5 | 13.5 | 13.4 | 13.3 |
| Solution temperature out quench | (° C.) | 69 | 62 | 58 | 54 | 52 | 49 | 46 | 41 |
| pH solution inlet quench | | 7.58 | 7.50 | 7.45 | 7.41 | 7.38 | 7.36 | 7.32 | 7.27 |

TABLE 7

Quench tower of 10 m

| Pre-treatment loop flow rate | (m³·h⁻¹) | 140 | 170 | 200 | 230 | 260 | 290 | 350 | 500 |
|---|---|---|---|---|---|---|---|---|---|
| Quench Tower Diameter | (m) | 3.1 | 3.1 | 3.2 | 3.2 | 3.2 | 3.3 | 3.3 | 3.5 |
| $CO_2$ removal | (%) | 0.03 | 0.03 | 0.04 | 0.04 | 0.04 | 0.04 | 0.04 | 0.04 |
| $SO_2$ removal | | 97.9 | 99.4 | 99.9 | 100 | 100 | 100 | 100 | 99.95 |
| [$K_2CO_3$] in solution out quench | (mmolL⁻¹) | 13.3 | 13.1 | 13.4 | 13.5 | 13.5 | 13.4 | 13.4 | 13.3 |
| Solution temperature out quench | (° C.) | 69 | 62 | 58 | 54 | 52 | 49 | 46 | 41 |
| pH solution inlet quench | | 7.57 | 7.46 | 7.41 | 7.37 | 7.34 | 7.32 | 7.29 | 7.24 |

TABLE 8

| Quench tower of 15 m | | | | | | | | | |
|---|---|---|---|---|---|---|---|---|---|
| Pre-treatment loop flow rate | ($m^3 \cdot h^{-1}$) | 140 | 170 | 200 | 230 | 260 | 290 | 350 | 500 |
| Quench Tower Diameter | (m) | 3.1 | 3.1 | 3.2 | 3.2 | 3.2 | 3.2 | 3.3 | 3.5 |
| $CO_2$ removal | (%) | 0.03 | 0.03 | 0.04 | 0.04 | 0.04 | 0.04 | 0.04 | 0.04 |
| $SO_2$ removal | | 99.96 | 99.95 | 99.95 | 99.95 | 99.95 | 99.95 | 99.95 | 99.95 |
| [$K_2CO_3$] in solution out quench | ($mmolL^{-1}$) | 13.3 | 13.1 | 13.4 | 13.5 | 13.5 | 13.5 | 13.4 | 13.4 |
| Solution temperature out quench | (° C.) | 69 | 62 | 58 | 54 | 51 | 49 | 46 | 41 |
| pH solution inlet quench | | 7.56 | 7.44 | 7.39 | 7.35 | 7.32 | 7.30 | 7.27 | 7.23 |

The simulations demonstrate that it is possible to remove a significant fraction of the $SO_2$ present in a flue gas, without removing $CO_2$, using a solution containing a low $K_2CO_3$ concentration in the range of 13 mmol/L, this is considerably lower than the absorption solution concentration which is 17% wt or 1.45 M $K_2CO_3$, corresponding to a 110 dilution factor.

The results also show that the $SO_x$ removal is influenced by the pre-treatment loop flow rate and by the quench tower height.

Example 4: Impact of the Concentration of $NO_x$ And $SO_x$ On the Bleed Stream Flow Rate for $CO_2$ Capture Process Equipped with a $SO_x$ Removal Unit. The Absorption Solution in the Absorption Loop is 17% Wt $K_2CO_3$ The $CO_2$ capture unit has a 100 tpd capacity and removes 90% of the $CO_2$ of the flue gas. The flue gas composition is found in Table 1. To determine the impact of $NO_x$ and $SO_2$ concentrations on the bleed stream flow rate, simulations were conducted considering 85% $SO_2$ removal using a 5 m height quench tower operated at 70% flooding, a pre-treatment loop flow rate of 200 $m^3$/h, a pre-treatment loop flow temperature of 30° C. We assumed no $NO_x$ removal in the quench tower under the adopted process conditions. The simulations were run for 2 cases: the first case corresponds to a process without $SO_x$ removal and the second case when 85% $SO_x$ removal is reached. Results are shown in Table 9.

TABLE 9

Influence of impurities on bleed flow rate [column height of 5 m; column flooding maintained at 70%; pre-treatment loop flow rate of 200 $m^3h^{-1}$; 17 wt % $K_2CO_3$ absorption solution]

| $SO_2$ (ppmv) | $NO_x$ (ppmv) | Bleed flow rate No pre-treatment ($m^3h^{-1}$) | $SO_2$ Capture (%) | Bleed flow rate Pre-treatment ($m^3h^{-1}$) | Fold Improvement (—) | pH solution inlet quench | $K_2CO_3$ pre-treatment loop solution ($mmolL^{-1}$) |
|---|---|---|---|---|---|---|---|
| 10 | 10 | 0.092 | 86 | 0.012 | 8 | 7.78 | 30 |
| 10 | 80 | 0.092 | 85 | 0.050 | 2 | 7.78 | 30 |
| 10 | 150 | 0.092 | 84 | 0.092 | 1 | 7.78 | 30 |
| 50 | 10 | 0.455 | 86 | 0.067 | 7 | 8.47 | 138 |
| 50 | 80 | 0.455 | 85 | 0.067 | 7 | 8.47 | 138 |
| 50 | 150 | 0.455 | 84 | 0.092 | 5 | 8.47 | 138 |
| 100 | 10 | 0.910 | 86 | 0.142 | 6 | 8.64 | 250 |
| 100 | 80 | 0.910 | 85 | 0.142 | 6 | 8.64 | 250 |
| 100 | 150 | 0.910 | 84 | 0.142 | 6 | 8.64 | 250 |

The above results indicate that when conditions are such that the $SO_2$ concentration and then the $SO_4^{2-}$ ion concentration absorbed in solution dictate the bleed flow rates, there is always an important decrease in the flow rate of the bleed stream, namely a decrease of at least of 5-folds However, when the $NO_x$ concentration is high, this results in nitrite and nitrate ion concentration levels having a negative impact on the process performance and then determining the bleed flow rate, then the $SO_x$ removal unit has no or limited impact. Moreover, it can be observed, for a fixed $NO_x$ concentration, that the bleed flow rate is proportional to the $SO_x$ concentration in the flue gas. Additionally, the increase in bleed flow rate increases the $K_2CO_3$ concentration in the process water as well as the pH value. The results on the impact of $SO_x$ removal might be different depending on $SO_x$ and $NO_x$ relative concentrations in the gas to be treated as it can be seen in the above Table.

Example 5: Impact of the Concentration of $NO_x$ And $SO_x$ On the Bleed Stream Flow Rate for $CO_2$ Capture Process Equipped with a $SO_x$ Removal Unit. The Absorption Solution in the Absorption Loop is 45% Wt $K_2CO_3$ The $CO_2$ capture unit has a 100 tpd capacity and removes 90% of the $CO_2$ of the flue gas. The flue gas composition is found in Table 1. To determine the impact of $NO_x$ and $SO_2$ concentrations on the bleed stream flow rate, simulations were conducted considering using same simulation conditions as Example 4. The conditions are: a 5 m height quench tower operated at 70% flooding, a pre-treatment loop flow rate of 200 $m^3$/h, pre-treatment loop flow temperature of 30° C. We assumed no $NO_x$ removal in the quench tower under the adopted process conditions. The simulations were run for 2 cases: the first case corresponds to a process without $SO_x$ removal and the second case with $SO_x$ removal. The percentage of $SO_2$ removal was evaluated for each case. Results are shown in Table 10.

TABLE 10

Influence of impurities on bleed rate [column height of 5 m; column flooding maintained at 70%; pre-treatment flow rate of 200 $m^3h^{-1}$; 45 wt % $K_2CO_3$ absorption solution]

| $SO_2$ (ppmv) | $NO_x$ (ppmv) | Bleed flow rate No pre-Treatment ($m^3h^{-1}$) | $SO_x$ Capture (%) | Bleed flow rate Pre-Treatment ($m^3h^{-1}$) | Fold Improvement (—) | pH | $K_2CO_3$ in process water ($mmolL^{-1}$) |
|---|---|---|---|---|---|---|---|
| 10 | 10 | 0.092 | 96 | 0.006 | 14 | 8.44 | 100 |
| 10 | 80 | 0.092 | 96 | 0.050 | 2 | 8.44 | 100 |
| 10 | 150 | 0.092 | 96 | 0.092 | 1 | 8.44 | 100 |
| 50 | 10 | 0.455 | 91 | 0.042 | 11 | 8.70 | 437 |
| 50 | 80 | 0.455 | 91 | 0.050 | 9 | 8.70 | 437 |
| 50 | 150 | 0.455 | 91 | 0.092 | 5 | 8.70 | 437 |
| 100 | 10 | 0.910 | 89 | 0.101 | 9 | 8.87 | 693 |
| 100 | 80 | 0.910 | 89 | 0.101 | 9 | 8.87 | 693 |
| 100 | 150 | 0.910 | 89 | 0.101 | 9 | 8.87 | 693 |

The above results indicate that when conditions are such that the $SO_2$ concentration and then the $SO_4^{2-}$ ion concentration absorbed in solution dictate the bleed flow rates, there is always an important decrease in the flow rate of the bleed stream, namely a decrease of at least 80%. However, when the $NO_x$ concentration is high this results in nitrite and nitrate ion concentrations having a negative impact on the process performance and then having an impact on the bleed flow rate, then the $SO_x$ removal unit has no or limited impact. Moreover, it can be observed, for a fixed $NO_x$ concentration, that the bleed flow rate is proportional to the $SO_x$ concentration in the flue gas. Additionally, the increase in solvent flow rate increases the $K_2CO_3$ concentration in the process water as well as the pH value. The results on the impact of $SO_x$ removal might be different depending on $SO_x$ and $NO_x$ relative concentrations in the gas to be treated as it can be seen in the above Table.

Example 6: Impact of Pre-Treatment Flow Temperature on $SO_x$ Removal Rate and Bleed Flow Rates Simulations were conducted for a 100 tpd $CO_2$ capture unit combined with a $SO_x$ removal unit in the pre-treatment loop. For the purpose of the simulations the height of the quench tower was 5 m, column flooding was maintained at 70% flooding, pre-treatment flow rate was 200 $m^3$/h, $SO_2$ concentration was 10 ppmv, the absorption solution for the absorption loop was 1.45 M $K_2CO_3$ or 17% wt $K_2CO_3$.

Figure 8:
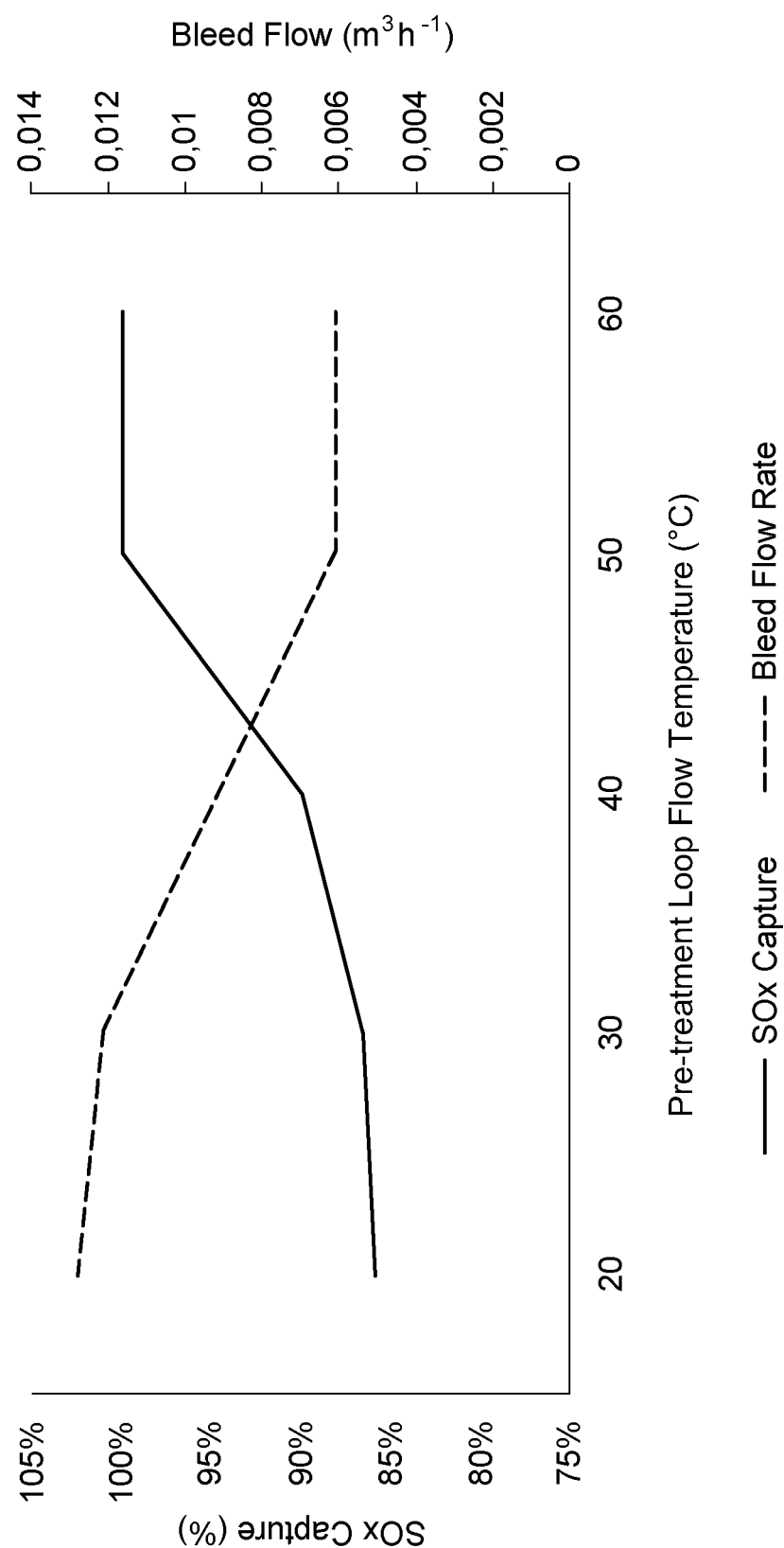
FIG. 8 is a graph representing the effect of the pre-treatment loop flow temperature on $SO_x$ capture and absorption solution bleed flow rate. Process conditions are: column height of 5 m; column flooding maintained at 70%; constant absorption solution bleed flow rate of 0.092 $m^3h^{-1}$; pre-treatment loop flow rate of 200 m³h⁻¹; inlet gas SO$_2$ concentration of 10 ppmv; absorption solution bleed at 17 wt % K$_2$CO$_3$.

The results indicate that additional benefits can be obtained by operating the pre-treatment loop at higher temperatures (FIG. 8). By increasing the pre-treatment loop flow temperature from 30 to 60° C., the $SO_2$ removal can be increased from 85 to 100% while the bleed flow rate would be decreased from 0.012 down to 0.006 $m^3$/h. Therefore, the $SO_x$ removal pre-treatment may still be integrated in a process where the gas temperature entering the absorber would be higher than 30° C.

The invention claimed is:

1. A process for removing $CO_2$ from a gas comprising at least water vapor, $CO_2$ and $SO_x$, where x is equal to 2 and/or 3, the gas having an initial gas temperature, the process comprising a pre-treatment loop for desulfurizing the gas and recovering a $SO_x$-depleted gas, and an absorption loop for removing $CO_2$ from the $SO_x$ depleted gas, wherein the process comprises cooling an alkaline aqueous solution comprising water and a carbonate and bicarbonate of an alkali metal to obtain a cooled alkaline aqueous solution having a temperature lower than the initial gas temperature; contacting the gas with the cooled alkaline aqueous solution in a desulfurization unit of the pre-treatment loop, thereby causing cooling of the gas, condensation of some water vapor and absorption of the Sox in the cooled alkaline aqueous solution, and producing the $SO_x$ depleted gas and an acidic aqueous solution comprising sulfate and/or sulfite ions; purging a first portion of the acidic aqueous solution exiting the desulfurization unit; supplying the $SO_x$ depleted gas which contains $CO_2$ from the desulfurization unit to a $CO_2$ capture unit of the absorption loop; in the $CO_2$ capture unit, contacting the $SO_x$ depleted gas with an absorption solution comprising water and carbonate of the alkali metal, thereby causing absorption of the $CO_2$ in the absorption solution and producing a $CO_2$-depleted gas and a carbonate and bicarbonate-rich absorption solution; treating the carbonate and bicarbonate-rich absorption solution in a stripping unit to generate a purified $CO_2$ gas and recover a carbonate and bicarbonate-lean absorption solution; bleeding a fraction of an absorption solution circulating in the absorption loop (e.g., from the carbonate and bicarbonate-lean absorption solution or from the carbonate and bicarbonate-rich absorption solution) as an absorption solution bleed; and mixing the absorption solution bleed with a second portion of the acidic aqueous solution exiting the desulfurization unit of the pre-treatment loop to produce the alkaline aqueous solution.

2. The process of claim 1, wherein the gas contacted with the cooled alkaline aqueous solution has a concentration in $SO_x$ of from 1 to 100 ppmv.

3. The process of claim 1, wherein the gas is a flue gas.

4. The process of claim 1, wherein the gas is a post-combustion flue gas.

5. The process of claim 1, wherein the temperature of the cooled alkaline aqueous solution is from about 5° C. to about 60° C.

6. The process of claim 1, wherein the cooled alkaline aqueous solution has a concentration in carbonate of the alkali metal of from about 1 mM to about 1 M.

7. The process of claim 1, wherein the cooled alkaline aqueous solution has a pH from 7 to 9.5.

8. The process of claim 1, wherein the desulfurization unit comprises a contacting device selected from a bubble column, a packed column with random packing, a packed column with structured packing, a venturi, a barometric leg, an eductor, a spraying device or a demister pad.

9. The process of claim 1, wherein the desulfurization unit comprises a packed column with random packing, a packed column with structured packing, or a spraying device.

10. The process of claim 1, wherein contacting the gas with the cooled alkaline aqueous solution is performed under conditions to produce a $SO_{X'}$ depleted gas in which at least 50% of the $SO_{X'}$ has been removed.

11. The process of claim 1, further comprising removing solid particles from the acidic aqueous solution.

12. The process of claim 1, further comprising removing solid particles from the acidic aqueous solution using a separation system selected from a radial vane separator, a Schoepentoeter device, a cyclone, a settling system or a filtration unit.

13. The process of claim 1, wherein the purging is performed to maintain a mass balance in the pre-treatment loop.

14. The process of claim 1, wherein the purging is performed at a flowrate determined by a water vapor condensation rate and an absorption solution bleed flowrate.

15. The process of claim 1, wherein the gas contacted with the cooled alkaline aqueous solution further comprises $NO_{x'}$, where x' is equal to 1 and/or 2.

16. The process of claim 15, wherein the $NO_{x'}$ are present in the gas in a concentration of from 10 to 150 ppmv.

17. The process of claim 15, further comprising adjusting a flow rate of the absorption solution bleed to maintain a concentration of nitrite and nitrate ions in the absorption loop for optimal $CO_2$ capture.

18. The process of claim 1, wherein contacting the $SO_{x'}$-depleted gas with the absorption solution in the $CO_2$ capture unit is performed in the presence of a carbonic anhydrase or an analogue thereof.

19. The process of claim 18, wherein the carbonic anhydrase or analogue thereof is present in the absorption solution.

20. The process of claim 19, wherein the carbonic anhydrase or analogue thereof is in a concentration below 0.1% by weight of the absorption solution.

21. The process of claim 1, wherein the absorption solution in the $CO_2$ capture unit has a concentration of from 1 to 5 mol $L^{-1}$.

22. The process of claim 1, wherein the alkali metal is potassium or sodium.

* * * * *